(12) United States Patent
Machida et al.

(10) Patent No.: US 10,730,272 B2
(45) Date of Patent: *Aug. 4, 2020

(54) HEAT-RAY SHIELDING FILM, HEAT-RAY SHIELDING LAMINATED TRANSPARENT SUBSTRATE, AUTOMOBILE, BUILDING, DISPERSOID, MIXED COMPOSITION, METHOD FOR MANUFACTURING DISPERSOID, DISPERSION LIQUID, AND METHOD FOR MANUFACTURING DISPERSION LIQUID

(71) Applicant: SUMITOMO METAL MINING CO., LTD., Tokyo (JP)

(72) Inventors: Keisuke Machida, Ichikawa (JP); Hiroki Nakayama, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 2 days.

This patent is subject to a terminal disclaimer.

(21) Appl. No.: 15/736,465

(22) PCT Filed: Jun. 27, 2016

(86) PCT No.: PCT/JP2016/069022
§ 371 (c)(1),
(2) Date: Dec. 14, 2017

(87) PCT Pub. No.: WO2017/002763
PCT Pub. Date: Jan. 5, 2017

(65) Prior Publication Data
US 2018/0170021 A1  Jun. 21, 2018

(30) Foreign Application Priority Data

Jun. 30, 2015 (JP) ................. 2015-131429

(51) Int. Cl.
| | | |
|---|---|---|
| *C08L 23/08* | (2006.01) | |
| *B32B 27/24* | (2006.01) | |
| *C08J 5/18* | (2006.01) | |
| *C08K 3/22* | (2006.01) | |
| *C08K 5/3475* | (2006.01) | |
| *C08L 29/14* | (2006.01) | |
| *C08L 31/04* | (2006.01) | |
| *C08L 101/00* | (2006.01) | |
| *B32B 27/18* | (2006.01) | |
| *C08L 23/26* | (2006.01) | |
| *C08K 5/057* | (2006.01) | |
| *C09K 3/00* | (2006.01) | |
| *B32B 17/10* | (2006.01) | |
| *C08K 5/54* | (2006.01) | |

(Continued)

(52) U.S. Cl.
CPC ........ *B32B 27/24* (2013.01); *B32B 17/10633* (2013.01); *B32B 17/10678* (2013.01); *B32B 17/10743* (2013.01); *B32B 17/10761* (2013.01); *B32B 17/10788* (2013.01); *B32B 27/18* (2013.01); *B32B 27/22* (2013.01); *C08J 5/18* (2013.01); *C08K 3/22* (2013.01); *C08K 5/05* (2013.01); *C08K 5/057* (2013.01); *C08K 5/3475* (2013.01); *C08K 5/54* (2013.01); *C08K 5/5403* (2013.01); *C08L 23/08* (2013.01); *C08L 23/0853* (2013.01); *C08L 23/26* (2013.01); *C08L 29/14* (2013.01); *C08L 31/04* (2013.01); *C08L 101/00* (2013.01); *C09K 3/00* (2013.01); *C08J 2300/22* (2013.01); *C08K 2003/2258* (2013.01); *C08L 2201/08* (2013.01); *C08L 2201/56* (2013.01); *C08L 2203/16* (2013.01)

(58) Field of Classification Search
CPC ......... B32B 27/18; B32B 27/24; B32B 27/22; B32B 17/10633; B32B 17/10678; B32B 17/10743; B32B 17/10761; B32B 17/10788; C08J 5/18; C08J 2300/22; C08K 5/057; C08K 5/3475; C08K 5/5403; C08K 5/05; C08K 5/54; C08K 2003/2258; C09K 3/00; C08L 23/08; C08L 29/14; C08L 31/04; C08L 101/00; C08L 23/0853; C08L 2201/56; C08L 2201/08; C08L 2203/16
See application file for complete search history.

(56) References Cited

U.S. PATENT DOCUMENTS

| | | |
|---|---|---|
| 5,376,446 A | 12/1994 | Huang |
| 5,830,568 A | 11/1998 | Kondo |
| 7,655,301 B2 | 2/2010 | Chonan et al. |

(Continued)

FOREIGN PATENT DOCUMENTS

| | | |
|---|---|---|
| CN | 104620144 | 5/2015 |
| JP | H04-160041 | 6/1992 |

(Continued)

OTHER PUBLICATIONS

International Search Report dated Oct. 11, 2016 with respect to PCT/JP2016/069022.

(Continued)

*Primary Examiner* — Nathan M Nutter
(74) *Attorney, Agent, or Firm* — IPUSA, PLLC

(57) ABSTRACT

There is provided a heat-ray shielding film including composite tungsten oxide particles; a thermoplastic resin; and a metal coupling agent, wherein the composite tungsten oxide particles are represented by a general formula $M_xWO_y$, where M is one or more elements selected from Cs, Rb, K, Tl, In, Ba, Li, Ca, Sr, Fe, Sn, Al, Cu, and Na, $0.1 \leq x \leq 0.5$, and $2.2 \leq y \leq 3.0$.

21 Claims, 1 Drawing Sheet

(51) Int. Cl.
   *B32B 27/22* (2006.01)
   *C08K 5/05* (2006.01)

(56) References Cited

U.S. PATENT DOCUMENTS

| | | | |
|---|---|---|---|
| 8,083,847 B2 | 12/2011 | Takeda et al. | |
| 9,783,455 B2 | 10/2017 | Kodaira et al. | |
| 2004/0041107 A1* | 3/2004 | Cadwalader et al. | G21F 1/103 250/519.1 |
| 2005/0048218 A1 | 3/2005 | Weidman | |
| 2009/0035583 A1* | 2/2009 | Fisher | B32B 17/10018 428/432 |
| 2010/0140533 A1 | 6/2010 | Fujita | |
| 2010/0187137 A1 | 7/2010 | Kitahara et al. | |
| 2010/0220388 A1* | 9/2010 | Suzuki et al. | B32B 17/10 359/359 |
| 2010/0247810 A1 | 9/2010 | Yukinobu et al. | |
| 2010/0261037 A1 | 10/2010 | Fujita | |
| 2011/0300356 A1 | 12/2011 | Takamatsu et al. | |
| 2011/0318578 A1 | 12/2011 | Hashimoto et al. | |
| 2012/0317903 A1 | 12/2012 | Kuwano et al. | |
| 2013/0187104 A1 | 7/2013 | Shiraishi et al. | |
| 2014/0044978 A1 | 2/2014 | Haldeman et al. | |
| 2014/0127522 A1 | 5/2014 | Fujita et al. | |
| 2015/0175837 A1 | 6/2015 | Brettmann et al. | |
| 2015/0192715 A1 | 7/2015 | Taguchi et al. | |
| 2015/0285972 A1 | 10/2015 | Hara et al. | |
| 2015/0306848 A1 | 10/2015 | Anderson et al. | |
| 2017/0363788 A1* | 12/2017 | Fukuda et al. | G02B 5/24 |

FOREIGN PATENT DOCUMENTS

| | | |
|---|---|---|
| JP | H08-217500 | 8/1996 |
| JP | H08-259279 | 10/1996 |
| JP | H08-281860 | 10/1996 |
| JP | H10-297945 | 11/1998 |
| JP | 2001-089202 | 4/2001 |
| JP | 2006-190867 | 7/2006 |
| JP | 2009-035459 | 2/2009 |
| JP | 2009-535248 | 10/2009 |
| JP | 2009-269806 | 11/2009 |
| JP | 2010-017854 | 1/2010 |
| JP | 2010-222233 | 10/2010 |
| JP | 2010-535695 | 11/2010 |
| JP | 2011-001551 | 1/2011 |
| JP | 2011-178608 | 9/2011 |
| JP | 2012-229388 | 11/2012 |
| JP | 2013-064042 | 4/2013 |
| JP | 2013-088762 | 5/2013 |
| WO | 2005/037932 | 4/2005 |
| WO | 2005-087680 | 9/2005 |
| WO | 2009/027160 | 3/2009 |
| WO | 2014/061279 | 4/2014 |

OTHER PUBLICATIONS

Database WPI, Week 200978, Thomson Scientific, London, GB;, AN 2009-R34807, XP002780133.
K. Adachi, et al., J. Appl. Phys. 114, 194304 (2013).
International Search Report dated Oct. 13, 2015 with respect to PCT/JP2015/068809.
Office Action dated Jan. 11, 2019 issued with respect to the related U.S. Appl. No. 15/501,472.
Office Action dated Jul. 9, 2019 issued with respect to the related U.S. Appl. No. 15/501,472.
Office Action dated Mar. 29, 2019 issued with respect to the related U.S. Appl. No. 15/625,110.
Office Action dated May 30, 2019 issued with respect to the related U.S. Appl. No. 15/625,110.
Office Action dated Sep. 26, 2019 issued with respect to the related U.S. Appl. No. 15/625,110.
Office Action dated Oct. 25, 2019 issued with respect to the related U.S. Appl. No. 15/501,472.
Office Action dated Feb. 19, 2020 issued with respect to the related U.S. Appl. No. 15/625,110.
Office Action dated Feb. 27, 2020 issued with respect to the related U.S. Appl. No. 15/501,472.
Office Action dated May 1, 2020 issued with respect to the related U.S. Appl. No. 15/625,110.
Office Action dated Jun. 9, 2020 issued with respect to the related U.S. Appl. No. 15/501,472.

* cited by examiner

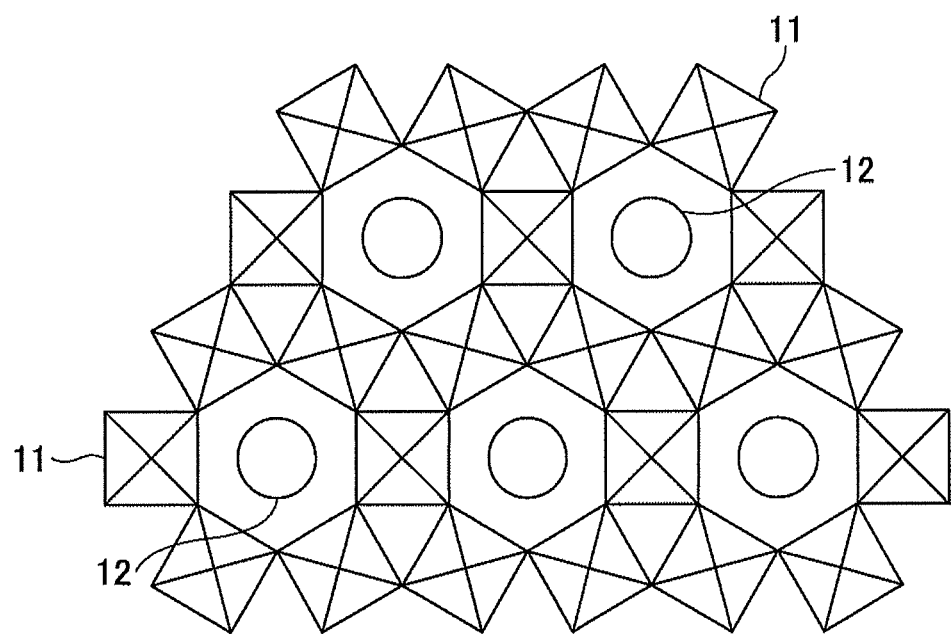

HEAT-RAY SHIELDING FILM, HEAT-RAY SHIELDING LAMINATED TRANSPARENT SUBSTRATE, AUTOMOBILE, BUILDING, DISPERSOID, MIXED COMPOSITION, METHOD FOR MANUFACTURING DISPERSOID, DISPERSION LIQUID, AND METHOD FOR MANUFACTURING DISPERSION LIQUID

TECHNICAL FIELD

The present invention relates to a heat-ray shielding film, a heat-ray shielding laminated transparent substrate, an automobile, a building, a dispersoid, a mixed composition, a method for producing a dispersoid, a dispersion liquid, and a method for producing a dispersion liquid.

BACKGROUND ART

There is a demand for a heat-ray shielding film with a heat-ray shielding capability (heat-ray shielding function) that can reduce a cooling load, a person's sensation of heat, adverse effects on plants, etc., which is for blocking a part of incoming solar energy, with regard to applications such as window materials for automobiles, buildings, etc., and films for vinyl houses, etc.; and various studies have been made.

A case has been reported such that, when a heat-ray shielding film is used, for example, as a window material, the heat-ray shielding film is disposed between a plurality of sheets of glass facing each other as an intermediate layer (interlayer) to form a laminated glass.

As an example in which a laminated glass is formed, Patent Document 1 discloses a laminated glass in which a flexible resin layer is formed, which includes, between a glass pair, a heat ray-shielding metal oxide that is one of tin oxide or indium oxide with a particle size of less than or equal to 0.1 μm.

Further, Patent Document 2 discloses a laminated glass provided with an intermediate film layer obtained by dispersing, between at least two transparent glass plates, functional ultrafine particles, such as one of a metal, an oxide, a nitride, a sulfide, and a Sb or F-doped material of Sn, Ti, Si, Zn, Zr, Fe, Al, Cr, Co, Ce, In, Ni, Ag, Cu, Pt, Mn, Ta, W, V, or Mo, or a composite obtained by selecting two or more of them.

Further, Patent Document 3 discloses a vehicle window glass obtained by forming, between transparent plates, a mixed layer of ultrafine particles with an average particle diameter of less than or equal to 0.1 μm and a glass component. As the ultrafine particles, a metal oxide of $TiO_2$, $ZrO_2$, $SnO_2$, $In_2O_3$, etc., and a mixture thereof are exemplified; and, as the glass component, organic silicon or an organic silicon compound is exemplified.

Furthermore, Patent Document 4 discloses a laminated glass such that a laminated interlayer including three layers is formed between at least two transparent glass plates, and functional ultrafine particles, such as one of a metal, an oxide, a nitride, a sulfide, and a Sb or F-doped material of Sn, Ti, Si, Zn, Zr, Fe, Al, Cr, Co, In, Ni, Ag, Cu, Pt, Mn, Ta, W, V, or Mo, or a composite obtained by selecting two or more of them, are dispersed in the second layer of the interlayer.

However, a problem is that, when a high level of visible light transmittance is required, a heat-ray shielding property of each of the laminated glasses disclosed in Patent Document 1 through Patent Document 4 is not sufficient.

Accordingly, the applicant of the present invention has disclosed, in Patent Document 5, a solar radiation shielding laminated glass such that an intermediate layer provided with a solar radiation shielding function is disposed between two glass plates, and the intermediate layer is formed of: an additive solution, which is obtained by dispersing hexaboride fine particles in a plasticizer (or an additive solution obtained by dispersing hexaboride fine particles and ITO fine particles and/or ATO fine particles in a plasticizer); and an interlayer formed of a vinyl-based resin.

Further, Patent Document 5 also discloses a solar radiation shielding laminated glass formed of: a solar radiation shielding film obtained by forming an intermediate layer provided with a solar radiation shielding function on a surface located at an inner side of at least one of two glass plates while disposing the intermediate layer between the two glass plates, and by applying, to the intermediate layer, a coating liquid including hexaboride fine particles as the solar radiation shielding component (or a coating solution including, as the solar radiation shielding component, hexaboride fine particles and at least one of ITO fine particles and ATO fine particles); and an interlayer disposed between the two glass plates and including a vinyl-based resin.

In a film in which hexaboride fine particles used in the solar radiation shielding laminated glass disclosed in Patent Document 5 are sufficiently dispersed finely and uniformly, the transmittance has a maximum value in a wavelength range from 400 nm to 700 nm, and has a minimum value in a wavelength range from 700 nm to 1800 nm. As a result, according to the solar radiation shielding laminated glass disclosed in Patent Document 5, even if the visible light transmittance is adjusted to be 77% or 78%, the solar radiation transmittance is approximately from 50% to 60%, and the performance is greatly improved compared to conventional laminated glasses disclosed in Patent Documents 1 through 4.

Furthermore, the applicant of the present invention discloses, in Patent Document 6, a solar radiation shielding laminated structure that is obtained by using, as fine particles provided with a solar radiation shielding function, tungsten oxide fine particles, and/or composite tungsten oxide fine particles, and by disposing, between two laminated plates selected from glass plates, etc., an intermediate layer obtained by dispersing, in a synthetic resin, such as a vinyl-based resin, fine particles provided with a solar radiation shielding function.

For the solar radiation shielding structure disclosed in Patent Document 6, there is a case in which the solar radiation transmittance is 35.7% when the visible light transmittance is 70.7%, and the performance is further improved compared to the conventional laminated glass described in Patent Documents 1 through 5.

PRIOR ART DOCUMENT

Patent Document

Patent Document 1: Japanese Unexamined Patent Publication No. H08-217500
Patent Document 2: Japanese Unexamined Patent Publication No. H08-259279
Patent Document 3: Japanese Unexamined Patent Publication No. H04-160041
Patent Document 4: Japanese Unexamined Patent Publication No. H10-297945
Patent Document 5: Japanese Unexamined Patent Publication No. 2001-89202
Patent Document 6: WO 2005/087680

SUMMARY OF THE INVENTION

Problem to be Solved by the Invention

However, when the intermediate layer of the solar radiation shielding laminated structure disclosed in Patent Document 6 includes the composite tungsten oxide fine particles as the fine particles provided with the solar radiation shielding function, the transmittance may be lowered by long-term exposure of strong ultraviolet radiation.

As described above, when a phenomenon of lowering the transmittance caused by ultraviolet light irradiation (which may be referred to as a light coloring phenomenon), the appearance and the transparency of the intermediate layer and the solar radiation shielding laminated structure in which the intermediate layer is used may be damaged. In view of the problem with the above-described conventional techniques, in one aspect of the present invention, an object is to provide a heat-ray shielding film that is provided with a high solar ray shielding property (heat ray shielding property, heat shielding property), and that suppresses a decrease in the transmittance due to ultraviolet light irradiation.

Means for Solving Problem

According to an embodiment of the present invention that solves the above-described problem, there is a heat-ray shielding film including composite tungsten oxide particles; a thermoplastic resin; and a metal coupling agent, wherein the composite tungsten oxide particles are represented by a general formula $M_xWO_y$, where M is one or more elements selected from Cs, Rb, K, Tl, In, Ba, Li, Ca, Sr, Fe, Sn, Al, Cu, and Na, $0.1 \leq x \leq 0.5$, and $2.2 \leq y \leq 3.0$.

Advantage of the Invention

According to an embodiment of the present invention, a heat-ray shielding film can be provided that is provided with a high solar ray shielding property and that suppresses a decrease in the transmittance due to ultraviolet light irradiation.

BRIEF DESCRIPTION OF THE DRAWINGS

The FIGURE is a schematic diagram of a crystal structure of a composite tungsten oxide provided with a hexagonal crystal.

EMBODIMENTS OF THE INVENTION

In the following, embodiments for implementing the present invention are described by referring to the drawings; however, the present invention is not limited to the embodiments described below, and various modifications and substitutions may be added to the embodiments described below without departing from the scope of the present invention.

(Heat-Ray Shielding Film)

In this embodiment, first, an example of a configuration of a heat-ray shielding film is described.

The heat-ray shielding film according to the embodiment may include composite tungsten oxide particles, a thermoplastic resin, and a metal coupling agent. As the composite tungsten oxide particles, composite tungsten oxide particles represented by a general formula $M_xWO_y$ (where, M is one or more elements selected from Cs, Rb, K, Tl, In, Ba, Li, Ca, Sr, Fe, Sn, Al, Cu, and Na, $0.1 \leq x \leq 0.5$, and $2.2 \leq y \leq 3.0$) can be used.

The inventors of the present invention have conducted intensive studies on a method of suppressing occurrence of a phenomenon, in a heat-ray shielding film (interlayer) including composite tungsten oxide fine particles, such that the transmittance is lowered by irradiation of ultraviolet light, namely, a light coloring phenomenon.

As a result, it was found that, by including composite tungsten oxide particles together with a metal coupling agent in the heat-ray shielding film, occurrence of a phenomenon such that, during irradiation of ultraviolet light, the transmittance is lowered can be significantly suppressed; and the present invention has been completed. The reason is not clear; however, it has been suggested that the decrease in the transmittance due to long-term exposure of intensive ultraviolet light may be caused by a change in a valence of tungsten by charge compensation, as hydrogen radicals generated in a resin decomposed by the ultraviolet light are doped to the composite tungsten oxide particles (cf. K. Adachi, et al., J. Appl. Phys. 114, 194304 (2013), for example).

In contrast, when a metal coupling agent is added to the heat-ray shielding film so that the metal coupling agent exists in the vicinity of the composite tungsten oxide particles, metal elements included in the metal coupling agent can substitute for tungsten for the change in the valence. Consequently, a decrease in the transmittance of the heat-ray shielding film can be suppressed. The inventors of the present invention are supposing that this is the principle of suppressing the occurrence of the light coloring phenomenon by addition of the metal coupling agent.

In the following, the heat-ray shielding film according to the embodiment is specifically described.

First, components forming the heat-ray shielding film according to the embodiment are described.

(1) Composite Tungsten Oxide Particles

As described above, composite tungsten oxide particles denoted by the general formula $M_xWO_y$ (where, M is one or more elements selected from Cs, Rb, K, Tl, In, Ba, Li, Ca, Sr, Fe, Sn, Al, Cu, and Na, $0.1 \leq x \leq 0.5$, and $2.2 \leq y \leq 3.0$) can preferably used as the composite tungsten oxide particles.

Note that, in the chemical formula $M_xWO_y$ representing the composite tungsten oxide, W represents tungsten, and O represents oxygen. Further, as described above, the element M in the above-described formula can preferably be one or more elements selected from Cs, Rb, K, Ti, In, Ba, Li, Ca, Sr, Fe, Sn, Al, Cu, and Na.

The above-described composite tungsten oxide particles are provided with an infrared absorption property. Accordingly, by including the composite tungsten oxide particles, the heat-ray shielding film according to the embodiment can suppress transmission of light in the infrared region, particularly in the near infrared region, so that the heat-ray shielding film according to the embodiment can exhibit the heat-ray shielding capability. As the absorptivity of the light in the visible region is extremely small compared with the absorptivity for the near-infrared region, even if the transmission of the light in the near-infrared region is sufficiently suppressed, high transparency can be maintained for the light in the visible region.

As described above, the composite tungsten oxide is represented by $M_xWO_y$ and has a composition such that the element M is added to the tungsten oxide ($WO_y$).

According to the studies by the inventors of the present invention, the tungsten oxide ($WO_y$) is also provided with an infrared absorption property. Among the tungsten oxides, an absorption and reflection property in the near infrared region of the tungsten trioxide ($WO_3$) is weak, as there exists no effective free electron in the tungsten trioxide. However, by adjusting y, which is the ratio of oxygen to tungsten in the tungsten oxide ($WO_y$), to be less than 3, free electrons can be generated in the tungsten oxide, and highly efficient infrared absorbing particles can be obtained. However, a crystal phase of $WO_2$ may cause absorption and scattering for the light in the visible region, and may lower absorption of the light in the near-infrared region.

For this reason, for the tungsten oxide particles, if y in the chemical formula represented by $WO_y$ satisfies $2.2 \leq y < 3.0$, occurrence of the crystal phase of $WO_2$ can be suppressed, and efficient infrared absorbing particles can be obtained.

Further, as for tungsten oxide particles, Magneli phase with a composition ratio represented by $2.45 \leq y < 3.0$ is chemically stable and exhibits a favorable absorption property for the light in the near-infrared region, so that it can be more preferably used as the infrared absorbing particles.

As for the composite tungsten oxide used for the heat-ray shielding film according to the embodiment, by adding the element M to the tungsten oxide, free electrons are generated in the composite tungsten oxide, and a strong absorption property, which is attributable to the free electrons, occurs in the near-infrared region. For this reason, it exhibits a special high property as an infrared absorbing material that absorbs a near infrared ray.

By combining the control of the amount of oxygen described for the tungsten oxide and the addition of the element M that generates free electrons, the composite tungsten oxide can be a more efficient infrared absorbing material. When the control of the amount of oxygen is combined with the addition of the element M that generates free electrons, the condition $0.1 \leq x < 0.5$ and $2.2 \leq y \leq 3.0$ may preferably be satisfied in the chemical formula $M_xWO_y$, which represents the composite tungsten oxide.

Here, the value of x is described, which represents an addition amount of the element M in the above-described chemical formula of the composite tungsten oxide. The value of x is preferably greater than or equal to 0.1 because a sufficient amount of free electrons can be generated and the objective infrared absorption effect can be obtained. As the addition amount of the element M increases, the amount of the free electrons supplied increases and the infrared absorption efficiency is enhanced; however, the effect is saturated when the value of x is approximately 0.5. Additionally, the value of x is preferably less than or equal to 0.5 because generation of an impurity phase in the infrared absorption material can be avoided.

Next, the value of y is described, which indicates control of an amount of oxygen. As for the value of y, a system similar to the above-described tungsten oxide ($WO_y$) is applied to the infrared absorbing material denoted by $M_xWO_y$, and, additionally, there is supply of free electrons at y=3.0 due to the addition amount of the element M, which is described above. For this reason, it is preferable that $2.2 \leq y \leq 3.0$. In particular, it is more preferable that $2.45 \leq y \leq 3.0$ because it becomes chemically more stable, as described for the tungsten oxide.

A crystal structure of the composite tungsten oxide included in the composite tungsten oxide particles is not particularly limited, and a composite tungsten oxide with any crystal structure may be included. It should be noted that, it is preferable that the composite tungsten oxide included in the composite tungsten oxide particles be provided with the crystal structure of the hexagonal crystal because the transmittance of the light in the visible region of the particles and the absorption of the light in the near-infrared region by the particles are particularly enhanced.

The FIGURE is a schematic plan view showing a crystal structure of the hexagonal crystal. In the FIGURE, six octahedrons, each formed of a unit of $WO_6$ indicated by the reference numeral 11, are assembled to form a gap (tunnel) having a hexagonal shape. Then, one unit is formed by arranging the element M indicated by the reference numeral 12 in the gap, and a large number of the one units are assembled to form the crystal structure of the hexagonal crystal.

As described above, when the composite tungsten oxide particles include the composite tungsten oxide including a unit structure such that a gap is formed by assembling six octahedrons, each formed of a unit of $WO_6$, and the element M is arranged in the gap, the transmittance of the light in the visible region and the absorption of the light in the near-infrared region can be particularly enhanced. Note that, it is not necessary that the whole composite tungsten oxide particles be formed of crystalline composite tungsten oxide particles provided with the structure shown in the FIGURE; and, for example, even if such a structure locally exists, an effect can be obtained that is for enhancing the transmittance of the light in the visible region and the absorption of the light in the near-infrared region. For this reason, the composite tungsten oxide particles as a whole may be crystalline or amorphous.

When an element M with a large ionic radius is added as the element M of the composite tungsten oxide, the above-described hexagonal crystals tend to be formed. Specifically, the hexagonal crystals tend to be formed, for example, when one or more of the elements of Cs, Rb, K, and Tl are added as the element M. For this reason, the element M preferably includes one or more of the elements of Cs, Rb, K, and Tl; and it is more preferable that the element M be one or more of the elements of Cs, Rb, K, and Ti. Note that an element other than the above-described elements may be sufficient for forming the hexagonal crystals, provided that the element M exists in the gap having the hexagonal shape formed by the $WO_6$ units; and it is not limited to the cases where some of the above-described elements are added as the element M.

When the crystal structures of the composite tungsten oxide included in the composite tungsten oxide particles are to be uniform hexagonal crystals, the value of x indicating the addition amount of the element M more preferably satisfies $0.20 \leq x \leq 0.50$, and furthermore preferably satisfies $0.25 \leq x \leq 0.40$. As described above, it is preferable that y be adjusted to be $2.2 \leq y \leq 3.0$. Note that, when y=3.0, it is considered that, by adjusting the value of x to be 0.33, the element M is arranged in each of the gaps having the hexagonal shapes.

Furthermore, the composite tungsten oxide included in the composite tungsten oxide particles may have a structure of tungsten bronze with tetragonal crystals or cubic crystals, in addition to the above-described hexagonal crystals; and the composite tungsten oxide having such a structure is also effective as an infrared absorbing material. Namely, it can be preferably used as the material included in the composite tungsten oxide particles to be added to the heat-ray shielding film. For the composite tungsten oxide, depending on its crystal structure, the absorption position in the near-infrared region tends to vary. For example, the absorption position in the near-infrared region tends to move toward the side of a longer wavelength for the tetragonal crystal, compared to the cubic crystal; and the absorption position in the near-infrared region tends to move toward the side of a longer wavelength for the hexagonal crystal, compared to the tetragonal crystal. Furthermore, in accordance with the variation in the absorption position, the absorption of the light in the visible region is the smallest for the hexagonal crystal, then the tetragonal crystal, and the absorption of the light in the visible region is the largest for the cubic crystal, among these. Therefore, when it is particularly required that the transmittance of the light in the visible region is high and that the absorption of the light in the near-infrared region is high, it is preferable to use tungsten bronze with hexagonal crystals. However, the tendency of the optical property described here is merely a rough trend, and it can vary depending on the type of the added element M, the addition amount, and the amount of oxygen. Consequently, the material of the infrared absorbing particles used for the heat-ray shielding film according to the embodiment is not limited to the material with the hexagonal crystals.

As described above, the crystal structure of the composite tungsten oxide included in the composite tungsten oxide particles that can be used for the heat-ray shielding film according to the embodiment is not limited; and, for example, composite tungsten oxides with different crystal structures may be simultaneously included.

However, as described above, the composite tungsten oxide particles with the hexagonal crystals can enhance the transmittance of the visible light and the absorption of the near-infrared light. For this reason, the crystal system of the composite tungsten oxide of the composite tungsten oxide particles included in the heat-ray shielding film according to the embodiment may preferably be a hexagonal crystal.

Further, for example, when Cs and/or Rb is used as the element M, the crystal structure of the composite tungsten oxide tends to be the hexagonal crystal, as described above. Furthermore, as the transmittance of the light in the visible region becomes high and the transmittance of the light in the infrared region, particularly in the near-infrared region, becomes low, the contrast between the transmittance of the light in the visible region and the transmittance of the light in the infrared region becomes large. For this reason, it is more preferable that the element M in the general formula $M_xWO_y$, which indicates the composite tungsten oxide, be Cs and/or Rb. In particular, when the element M includes Cs, the light resistance of the composite tungsten oxide becomes higher, so that it is particularly preferable that the M include Cs.

A particle size of the composite tungsten oxide particles is not particularly limited, and it can be freely selected depending on the application in which the heat-ray shielding film is used. For example, when the heat-ray shielding film is to be used for an application which requires particularly high transparency with respect to the light in the visible region, the composite tungsten oxide particles may preferably be fine particles, and a volume average particle size of the composite tungsten oxide particles may preferably be less than or equal to 100 nm. The reason is that, when the volume average particle size of the composite tungsten oxide particles is less than or equal to 100 nm, shielding of the light due to light scattering can be suppressed, and the transparency can be efficiently maintained while maintaining the visibility in the visible region.

Note that the volume average particle size implies the particle size at a cumulative value of 50% in the particle size distribution obtained by the laser diffraction/scattering method; and, in the other part of the present specification, the volume average particle size has the same meaning.

Furthermore, when the heat-ray shielding film according to the embodiment is to be used for an application in which the transparency in the visible region is particularly emphasized, such as an automobile roof or a side window, it is preferable to further consider reduction of scattering by the composite tungsten oxide particles. When the further reduction of the scattering is considered, the volume average particle size of the composite tungsten oxide particles may preferably be less than or equal to 40 nm, more preferably less than or equal to 30 nm, and particularly preferably less than or equal to 25 nm.

The reason is that, by reducing the volume average particle size of the composite tungsten oxide particles, scattering of the light in the visible region of the wave length range from 400 nm to 780 nm due to geometric scattering or Mie scattering can be reduced. By reducing the scattering of the light with the above-described wavelength, a situation can be avoided such that, when strong light is irradiated, the appearance of the heat-ray shielding film becomes like that of a foggy glass and the clear transparency is lost.

When the volume average particle size of the composite tungsten oxide particles becomes less than or equal to 40 nm, the geometric scattering or Mie scattering described above is reduced and the Rayleigh scattering region is formed. In the Rayleigh scattering region, the scattered light decreases in inverse proportion to the sixth power of the particle size, so that the scattering is reduced in accordance with the decrease in the dispersed particle size and the transparency is enhanced. Furthermore, it is preferable that the volume average particle size of the composite tungsten oxide particles be less than or equal to 30 nm, particularly less than or equal to 25 nm, because the amount of the scattered light becomes extremely small.

As described above, from the perspective of avoiding scattering of light, the volume average particle size of the composite tungsten oxide particles may preferably be small. However, when the volume average particle size of the composite tungsten oxide particles is too small, it may become difficult to handle the heat-ray shielding film during manufacturing it, or condensation may occur in the heat-ray shielding film. Thus, the volume average particle size of the composite tungsten oxide particles may preferably be greater than or equal to 1 nm.

The amount (content) of the composite tungsten oxide particles included in the heat-ray shielding film is not particularly limited; and it can be freely selected depending on the degree of the heat ray shielding capability required for the heat-ray shielding film, a degree of visible light transmittance, etc. For example, the content of the composite tungsten oxide particles in the heat-ray shielding film per unit area in the projected area of the heat-ray shielding film may preferably be greater than or equal to 0.05 $g/m^2$ and less than or equal to 5.0 $g/m^2$, more preferably greater than or equal to 0.1 $g/m^2$ and less than or equal to 2.0 $g/m^2$.

(2) Thermoplastic Resin

The thermoplastic resin is not particularly limited. Various types of known resin may be used, and it can be freely selected depending on an application, etc., of the heat-ray shielding film. In particular, from a perspective of transparency, light resistance, etc., the thermoplastic resin may preferably be one or more selected from an ionomer resin, a polyvinyl acetal resin, and an ethylene-vinyl acetate copolymer resin.

Note that, when the thermoplastic resin is one or more selected from an ionomer resin, a polyvinyl acetal resin, and an ethylene-vinyl acetate copolymer resin, as described above, adhesion to a transparent substrate can be enhanced.

Accordingly, for example, when the heat-ray shielding film is used while securing it on one surface of a transparent substrate, or when the heat-ray shielding film is used as an intermediate layer of a heat-ray shielding laminated transparent substrate, the adhesion to the transparent substrate can be enhanced, and, thus, it is preferable.

In particular, the thermoplastic resin may preferably include an ionomer resin, and the thermoplastic resin may more preferably be an ionomer resin. When the heat-ray shielding film includes composite tungsten oxide particles as the particles provided with a heat-ray shielding function, if the heat-ray shielding film is held in a high-temperature and high-humidity environment for a long time, a decoloring phenomenon (edge fade phenomenon) may occur such that a color disappears from an edge of the heat-ray shielding film. However, according to the studies by the inventors of the present invention, by using an ionomer resin as the thermoplastic resin used for the heat-ray shielding film, the decoloring phenomenon can be suppressed.

The ionomer resin is not particularly limited. Various types of known ionomer resins can be used, and it can be freely selected depending on an application, etc., in which the heat-ray shielding film is to be used. As the ionomer resin, for example, ethylene-based ionomers, styrene-based ionomers, ionomer elastomers, perfluorocarbon ionomers, urethane ionomers, etc., are known; and, as described above, any ionomer resin can be selected depending on an application, required performance, etc., to be used. Further, only one type of the ionomer resin may be used for the heat-ray shielding film; however, two or more types of the ionomer resins may be combined to be used.

In particular, the heat-ray shielding film according to the embodiment or the below-described heat-ray shielding laminated transparent substrate using the heat-ray shielding film can preferably be used, for example, as a window material for an automobile or a building, a film for a vinyl house, etc. For this reason, the thermoplastic resin included in the heat-ray shielding film may preferably be superior in transparency, may preferably have high visible light transmittance and a low haze value, and may preferably be superior in penetration resistance and light resistance. Furthermore, when the heat-ray shielding film is to be disposed on the transparent substrate, it may preferably be superior in adhesion to the transparent substrate.

From the above-described perspective, when the thermoplastic resin used for the heat-ray shielding film according to the embodiment is an ionomer resin, the ionomer resin may more preferably include an ethylene ionomer, and the ionomer resin may further more preferably be an ethylene ionomer.

Further, a metal ion included in the ionomer resin is not particularly limited; and, for example, an ionomer resin including one or more metal ions selected from zinc, magnesium, lithium, potassium, and sodium may be used. In particular, an ionomer resin including zinc ions may preferably be used.

Specifically, as the ionomer resin, for example, there are a metallic element ionomer of ethylene-acrylic acid-acrylic acid ester copolymer; a metallic element ionomer of ethylene-acrylic acid-methacrylic acid ester copolymer; a metallic element ionomer of ethylene-methacrylic acid-acrylate copolymer; a metallic element ionomer of ethylene-methacrylic acid-methacrylic acid ester copolymer, etc. Note that metal ions included in any of the ionomer resins are not particularly limited; and, for example, one or more types of metal ions selected from zinc, magnesium, lithium, potassium, and sodium may be included.

More specifically, as an ionomer resin, for example, the Surlin (registered trademark) series by DuPont Ltd., Hi-Milan (registered trademark) series by Dupont-Mitsui Polychemicals Co., Ltd., IOTEK (registered trademark) series by Exxon Mobil Chemical, Ltd., etc., may preferably be used.

(3) Metal Coupling Agent

As described above, for a dispersant obtained by dispersing composite tungsten oxide particles in a resin, a light coloring phenomenon may be caused by long-term exposure of strong ultraviolet light. The inventors of the present invention have studied methods of suppressing occurrence of the light coloring phenomenon, and found that the occurrence of the light coloring phenomenon can be suppressed by adding a metal coupling agent to the heat-ray shielding film.

The metal coupling agent is not particularly limited; and, for example, a silane coupling agent, a titanate-based coupling agent (titanate coupling agent), an aluminate-based coupling agent (aluminate coupling agent), etc., can be used. Note that the metal coupling agent to be added to the heat-ray shielding film is not limited to one type, and two or more types of coupling agents may be simultaneously added.

In particular, as a metal coupling agent, a silane coupling agent can preferably be used. It is preferable that a metal coupling agent include a silane coupling agent, and it is more preferable that the metal coupling agent be the silane coupling agent. Note that, even if the metal coupling agent is the silane coupling agent, the metal coupling agent to be used for the heat-ray shielding film is not limited to one type of silane coupling agent, and one type or two or more types of silane coupling agents may be simultaneously added.

The silane coupling agent is not particularly limited; however, for example, 3-aminopropyltrimethoxysilane, 3-aminopropyltriethoxysilane, 3-(2-aminoethylamino) propyldimethoxymethylsilane, trimethoxy [3-(phenylamino) propyl] silane, 3-(2-aminoethylamino) propyltrimethoxysilane, 3-glycidoxypropyltrimethoxysilane, 3-glycidoxypropylmethyldimethoxysilane, 3-glycidoxypropyltriethoxysilane, 3-glycidoxypropylmethyldiethoxysilane, 2-(3,4-epoxycyclohexyl) ethyltrimethoxysilane, bis (3-(triethoxysilyl) propyl) disulfide, bis (3-(triethoxysilyl) propyl) tetrasulfide, vinyl triacetoxysilane, vinyltrimethoxysilane, vinyl triethoxysilane, acryloyltrimethoxysilane, 3-Methacryloxypropyltrimethoxysilane, 3-methacryloxypropylmethyldimethoxysilane, 3-mercaptopropyltrimethoxysilane, 3-mercaptopropylmethyldimethoxysilane, etc., can preferably be used.

The titanate-based coupling agent is not particularly limited; however, for example, tetramethoxytitanium, tetraethoxytitanium, tetraisopropoxytitanium, tetra-normal-butoxytitanium, tetraisobutoxy-titanium, tetra-2-ethylhexoxide-titanium, tetrakis (methoxypropoxy) titanium, tetraphenoxy-titanium, tetrabenzyloxy titanium, tetraphenylethoxytitanium, tetraphenoxyethoxy titanium, tetranaphthyloxy titanium, tetra-2-ethylhexoxy titanium, monoethoxytriisopropoxytitanium, diisopropoxy diisobutoxy titanium, allyloxy (polyethyleneoxy) trisisopropoxytitanium, titanium chloride triisopropoxide, titanium dichloride diethoxide, titanium 2-ethyl hexoxide, titanium iodide triisopropoxide, titanium tetramethoxypropoxide, titanium tetramethyl phenoxide, titanium n-nonyloxide, titanium tetrastearyl oxide, titanium triisostearoyl monoisopropoxide, etc., can preferably be used.

The aluminate-based coupling agent is not particularly limited; however, for example, aluminum ethylate, aluminum isopropylate, aluminum diisopropylate mono-sec-butylate, aluminum secondary butyrate, aluminum ethyl acetoacetate diisopropylate, aluminum trisethylacetoacetate, aluminum alkyl acetoacetate diisopropylate, aluminum bisethylacetoacetate monoacetylacetonate, aluminum trisacetylacetonate, etc. can preferably be used.

Further, depending on the type of the compound of the metal coupling agent, the metal coupling agent may enhance dispersibility of the composite tungsten oxide particles in the heat-ray shielding film, and may enhance transparency of the heat-ray shielding film. The reason is that a functional group included in the metal coupling agent may adsorb the composite tungsten oxide particles, and condensation with any other composite tungsten oxide particles may be prevented due to steric hindrance. In this case, depending on the addition of the compound, both the above-described effect caused by the addition of the metal coupling agent and the effect caused by addition of a dispersant may be obtained. For example, as the metal coupling agent that exhibits such an effect, there is a metal coupling agent that includes an epoxy group and/or an amino group in its structure. Accordingly, when enhancement of the transparency of the heat-ray shielding film is particularly required, the metal coupling agent may preferably include an epoxy group and/or an amino group.

As a silane coupling agent that includes an epoxy group and/or an amino group in its structure, for example, 3-aminopropyltrimethoxysilane, 3-aminopropyltriethoxysilane, 3-(2-aminoethylamino) propyltrimethoxysilane, 3-(2-aminoethylamino) propyldimethoxymethylsilane, trimethoxy [3-(phenylamino) propyl] silane, etc. can preferably be used.

The percentage of the metal coupling agent content in the heat-ray shielding film is not particularly limited, and it can be freely selected depending on the visible light transmittance required for the heat-ray shielding film, the light resistance of the composite tungsten oxide particles, the above-described particle dispersibility, etc. For example, the percentage of the metal coupling agent content in the heat-ray shielding film may preferably be greater than or equal to 0.01% by mass and less than or equal to 0.50% by mass. The reason is that, when the percentage of the metal coupling agent content is greater than or equal to 0.01% by mass, the effect of the addition of the metal coupling agent can be exhibited in the heat-ray shielding film. Additionally, when the content is less than or equal to 0.05% by mass, the metal coupling agent is not precipitated in the heat-ray shielding film and does not provide any significant effect on the strength, the adhesive strength, and the penetration resistance of the film.

(4) Other Components

In addition to the above-described composite tungsten oxide, thermoplastic resin, and metal coupling agent, an optional component may further be added to the heat-ray shielding film according to the embodiment. Components that can be optionally added are described below.

In order to uniformly disperse the above described composite tungsten oxide particles in the thermoplastic resin, a dispersant may be added to the heat-ray shielding film according to the embodiment.

The dispersant is not particularly limited, and it can be freely selected depending on a manufacturing condition, etc., of the heat-ray shielding film. For example, the dispersant may preferably have a thermal decomposition temperature, which is measured using a differential thermal/thermogravimetric simultaneous measurement apparatus (which may be denoted as TG-DTA below), of greater than or equal to 250° C., and may preferably include a main chain selected from a urethane main chain, an acrylic main chain, a styrene main chain, or a main chain obtained by copolymerizing two or more types of unit structures selected from urethane, acrylic, and styrene. Here, the thermal decomposition temperature is the temperature at which weight reduction due to thermal decomposition of the dispersant starts, in the measurement conforming to JIS K 7120 using TG-DTA.

When the thermal decomposition temperature of the dispersant is greater than or equal to 250° C., decomposition of the dispersant during mixing it with the thermoplastic resin can be prevented, brown coloring and reduction in the visible light transmittance of the heat-ray shielding film caused by decomposition of the dispersant can be suppressed, and a situation can be more reliably avoided in which the original optical property may not be obtained.

Further, the dispersant may preferably include, as a functional group, at least one type selected from a group including an amine; a hydroxyl group, a carboxyl group, and an epoxy group. The dispersant including any one of the above-described functional groups can preferably be used because it can adsorb to the surface of the composite tungsten oxide particles, it can prevent condensation of the composite tungsten oxide particles, and it can cause the composite tungsten oxide particles to be more uniformly dispersed in the heat-ray shielding film.

For example, as the dispersant having any one of the above-described functional groups, specifically, there are an acryl-styrene copolymer-based dispersant having a carboxyl group as a functional group, an acrylic dispersant having a group including an amine as a functional group, and so forth. The dispersant having a group including an amine may preferably have a molecular weight Mw of 2000 through 200000 and an amine value of 5 mg KOH/g through 100 mg KOH/g. Further, the dispersant having a carboxyl group may preferably have a molecular weight Mw of 2000 through 200000 and an acid value of 1 mg KOH/g through 50 mg KOH/g.

The amount of the dispersant to be added is not particularly limited; however, for example, the added amount may preferably be greater than or equal to 10 parts by mass and less than or equal to 1000 parts by mass with respect to 100 parts by mass of the composite tungsten oxide particles, and the added amount may more preferably be greater than or equal to 30 parts by mass and less than or equal to 400 parts by mass.

When the added amount of the dispersant is within the above-described range, the composite tungsten oxide particles can be more reliably dispersed uniformly in the thermoplastic resin, and there is no adverse effect on the physical properties of the obtained heat-ray shielding film.

Further, the heat-ray shielding film according to the embodiment may further include an ultraviolet absorbing agent.

As described above, as the composite tungsten oxide particles are added to the heat-ray shielding film according to the embodiment, transmission of light mainly in the near-infrared region can be suppressed. Consequently, transmission of heat rays can be suppressed, and the temperature rise in an inner side of a region where the heat-ray shielding film is disposed can be suppressed.

Then, by further adding an ultraviolet absorbing agent to the heat-ray shielding film, light in the ultraviolet region can further be cut, and the effect of suppressing the temperature rise can be particularly enhanced. Additionally, by adding an ultraviolet absorbing agent to the heat-ray shielding film according to the embodiment, for example, inside a vehicle or a building in which the heat-ray shielding film is installed, an influence of ultraviolet rays and sunburn against humans and interior decorations, and deterioration, etc., of furniture and interior decorations can be sufficiently prevented.

Further, in the heat-ray shielding film obtained by dispersing the composite tungsten oxide particles in the resin, a light coloring phenomenon may occur such that the transmittance is lowered by long-term exposure of strong ultraviolet light. However, by adding an ultraviolet absorbing agent to the heat-ray shielding film according to the embodiment, occurrence of a light coloring phenomenon can also be suppressed.

Note that the effect of suppressing the light coloring phenomenon caused by the addition of the ultraviolet absorbing agent is based on a mechanism that is clearly different from that of the effect for suppressing the light coloring phenomenon caused by the addition of the metal coupling agent.

Consequently, the effect of suppressing the light coloring phenomenon caused by further adding the ultraviolet absorbing agent and the effect of suppressing the light coloring phenomenon caused by adding the metal coupling agent are not contrary to each other, and these effects work synergistically to particularly suppress the light coloring phenomenon.

The ultraviolet absorbing agent is not particularly limited, and it can be freely selected depending on the influence on the visible light transmittance, etc., of the heat-ray shielding film, ultraviolet absorbing ability, durability, etc. As the ultraviolet absorbing agent, for example, there are an organic ultraviolet absorbing agent, such as a benzophenone compound, a salicylic acid compound, a benzotriazole compound, a triazine compound, a benzotriazolyl compounds, and a benzoyl compound, and an inorganic ultraviolet absorbing agent, such as a zinc oxide, a titanium oxide, and a cerium oxide. In particular, the ultraviolet absorbing agent may preferably include one or more types selected from a benzotriazole compound and a benzophenone compound. The reason is that, even if sufficient concentration of a benzotriazole compound or a benzophenone compound to absorb ultraviolet light is added, the visible light transmittance of the heat-ray shielding film can be made extremely high and durability against long-term exposure of strong ultraviolet light is high.

Furthermore, the ultraviolet absorbing agent may more preferably include, for example, a compound represented by Chemical Formula 1 and/or Chemical Formula 2, which are shown below.

[Chemical Formula 1]

(Chemical Formula 1)

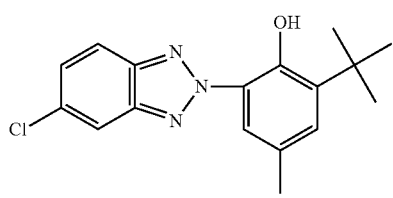

[Chemical Formula 2]

(Chemical Formula 2)

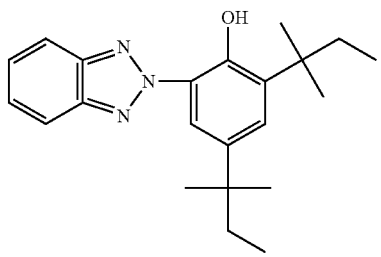

The content of the ultraviolet absorbing agent in the heat-ray shielding film is not particularly limited, and it can be freely selected depending on the visible light transmittance and the ultraviolet shielding ability required for the heat-ray shielding film. The content of the ultraviolet absorbing agent in the heat-ray shielding film may preferable be greater than or equal to 0.02% by mass and less, than or equal to 5.0% by mass, for example. The reason is that, when the content of the ultraviolet absorbing agent is greater than or equal to 0.02% by mass, the ultraviolet light that may not be fully absorbed by the composite tungsten oxide particles can be sufficiently absorbed. Additionally, when the content of the ultraviolet absorbing agent is less than or equal to 5.0% by mass, the ultraviolet absorbing agent is not precipitated in the heat-ray shielding film, and does not provide any significant effect on the strength, the adhesive strength, and the penetration resistance of the film.

Further, the heat-ray shielding film according to the embodiment may also include HALS (hindered amine light stabilizer). As described above, by adding the ultraviolet absorbing agent, the ultraviolet absorbing capability can be enhanced in the heat-ray shielding film and the heat-ray shielding laminated substrate according to the embodiment. However, depending on the environment in which the heat-ray shielding film or the heat-ray shielding laminated transparent substrate according to the embodiment is practically used, or the type of the ultraviolet absorbing agent, the ultraviolet absorbing agent may be deteriorated in accordance with its use for a long time, and the ultraviolet absorbing capability may be lowered. By the addition of HALS, deterioration of the ultraviolet absorbing agent can be prevented, and maintenance of the ultraviolet absorbing capability of the heat-ray shielding film and the heat-ray shielding laminated transparent substrate according to the embodiment can be facilitated.

Further, as described above, in the heat-ray shielding film obtained by dispersing the composite tungsten oxide particles in the resin, a light coloring phenomenon may occur such that the transmittance is lowered due to long-term exposure of strong ultraviolet light. However, similar to the addition of the ultraviolet absorbing agent and the metal coupling agent, by adding HALS to the heat-ray shielding film according to the embodiment, occurrence of the light coloring phenomenon can be suppressed.

Note that the effect of suppressing the light coloring phenomenon caused by addition of HALS is based on a mechanism that is clearly different from that of the effect of suppressing the light coloring phenomenon caused by addition of the metal coupling agent.

Consequently, the effect of suppressing the light coloring phenomenon caused by further adding HALS and the effect of suppressing the light coloring phenomenon caused by adding the metal coupling agent are not contrary to each other, and these effects work synergistically to particularly suppress the light coloring phenomenon.

Furthermore, HALS itself is a compound provided with the ultraviolet absorbing capability. In this case, depending on the addition of the compound, both the above-described effect caused by the addition of the ultraviolet absorbing agent and the effect caused by addition of HALS may be obtained.

HALS is not particularly limited, and it can be freely selected depending on the effect on the visible light transmittance of the heat-ray shielding film, affinity with the ultraviolet absorbing agent, durability, etc. For example, bis (2,2,6,6-tetramethyl-4-piperidyl) sebacate, bis (1,2,2,6,6-pentamethyl-4-piperidyl) sebacade, 1-[2-(3,5-t-butyl-4-hydroxyphenyl) propionyloxy] ethyl]-4-[3-(3,5-di-t-butyl-4-hydroxyphenyl) propionyl oxy] 2,2,6,6-tetramethylpiperidine, 4-benzoyloxy-2,2,6,6-tetramethylpiperidine, 8-acetyl-3-dodecyl-7,7,9,9-tetramethyl-1,3,8-triazaspiro [4,5] decane-2,4-dione, bis-(1, 2,2,6,6-pentamethyl-4-piperidyl)-2-(3,5-di-t-butyl-4-hydroxybenzyl)-2-n-butyl malonate, tetrakis (1,2,2,6,6-pentamethyl-4-piperidyl)-1,2,3,4-butanetetracarboxylate, tetrakis (2,2,6,6-tetramethyl-4-piperidyl)-1,2,3,4-butanetetracarboxylate, (Mixed 1,2,2,6,6-pentamethyl-4-piperidyl/tridecyl)-1,2,3,4-butanetetracarboxylate, mixed {1,2,2,6,6-pentamethyl-4-piperidyl/β, β, β', β'-tetramethyl-3,9-[2,4,8, 10-tetraoxaspiro (5, 5) undecane] diethyl}-1,2,3,4-butanetetracarboxylate, (Mixed 2,2,6,6-tetramethyl-4-piperidyl/tridecyl)-1,2,3,4-butane tetra carboxylate, mixed {2,2,6,6-tetramethyl-4-piperidyl/β, β, β', β'-tetramethyl-3,9-[2,4,8,10-tetraoxaspiro (5) Undecane] diethyl}-1,2,3,4-butanetetracarboxylate, 2,2,6,6-tetramethyl-4-piperidyl methacrylate, 1,2,2,6,6-pentamethyl-4-piperidyl methacrylate, poly [(6-(1,1,3,3-tetramethylbutyl) imino-1,3,5-triazine-2,4-diyl)] [(2,2,6,6-tetramethyl-piperidyl) imino] hexamethylene [(2,2,6,6-tetramethyl-4-piperidyl) iminol], dimethylsuccinate polymer—with—4-hydroxy-2, 2, 6, 6-tetramethyl-1-piperidineethanol (a polymer of dimethyl succinate and 4-hydroxy-2, 2, 6, 6-tetramethyl-1-piperidine ethanol), N, N', N'', N'''-tetrakis-(4,6-bis-(butyl-(N-methyl-2,2,6,6-tetramethylpiperidin-4-yl) amino)-triazin-2-yl)-4,7-diazadecane-1,10-diamine, a polycondensate of dibutylamine-1,3, 5-triazine-N, N'-bis (2,2,6,6-tetramethyl)-4-piperidyl-1,6-hexamethylenediamine and N-(2,2,6,6-tetramethylpiperidyl) butylamine, decanedioic acid bis (2,2, 6,6-tetramethyl-1-(octyloxy)-4-piperidinyl) ester, etc., can preferably be used.

The content of HALS in the heat-ray shielding film is not particularly limited, and it can be freely selected depending on the visible light transmittance and light resistance required for the heat-ray shielding film. For example, the content of HALS in the heat-ray shielding film may preferably be greater than or equal to 0.05% by mass and less than or equal to 5.0% by mass. The reason is that, when the content of HALS is greater than or equal to 0.05% by mass, the effect by addition of HALS can be exhibited in the heat-ray shielding film. Additionally, when the content is less than or equal to 5.0% by mass, HALS is not precipitated in the heat-ray shielding film, and does not provide any significant effect on the strength, the adhesive strength, and the penetration resistance of the film.

The heat-ray shielding film according to the embodiment may further include an antioxidant (anti-oxidizing agent).

By the addition of the antioxidant, oxidation deterioration of the resin can be suppressed, and the light resistance of the heat-ray shielding film can further be enhanced. Additionally, oxidation deterioration of other additives included in the resin, such as the composite tungsten oxide, the metal coupling agent, the ultraviolet absorbing agent, and HALS, and a dye compound, a pigment compound, an infrared absorbing material, a surfactant, and an antistatic agent, which are described below, can be suppressed, and the light resistance can be enhanced.

For example, a phenol-based antioxidant, a sulfur-based antioxidant, a phosphorus-based antioxidant, etc., can preferably be used; and, more specifically, 2,6-di-t-butyl-p-cresol, butylated hydroxyanisole, 2,6-di-t-butyl-4-ethylphenol, stearyl-β-(3,5-di-t-butyl-4-hydroxyphenyl) propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl) butane, tetrakis [methylene-3-(3', 5'-butyl-4-hydroxyphenyl) propionate] methane, 1,3,3-tris-(2-methyl-4-hydroxy-5-t-butylphenol) butane, 1,3,5-trimethyl-2,4,6-tris (3,5-di-t-butyl-4-hydroxybenzyl) benzene, bis (3,3'-t-butylphenol) butyric acid glycol ester, etc., can preferably be used.

The content of the antioxidant in the heat-ray shielding film is not particularly limited, and it can be freely selected depending on the visible light transmittance, the light resistance, etc., required for the heat-ray shielding film. For example, the content of the antioxidant in the heat-ray shielding film may preferably be greater than or equal to 0.05% by mass and less than or equal to 5.0% by mass. The reason is that, when the content of the antioxidant is greater than or equal to 0.05% by mass, the effect by addition of the antioxidant can be exhibited in the heat-ray shielding film. Additionally, when the content is less than or equal to 5.0% by mass, the antioxidant is not precipitated in the heat-ray shielding film, and does not provide any significant effect on the strength, the adhesive strength, and the penetration resistance of the film.

The dispersant, the ultraviolet absorbing agent, HALS, and the antioxidant are described as the optional additives; however, various other types of additives may be mixed.

For example, depending on an application, flexibility and adhesiveness to the transparent substrate may be required for the heat-ray shielding film. However, depending on a thermoplastic resin included in the heat-ray shielding film according to the embodiment, the obtained heat-ray shielding film may not sufficiently meet the above-described performance. In such a case, additionally, a plasticizer may preferably be added.

Note that, for example, when a polyvinyl acetal resin is used as a thermoplastic resin, flexibility and adhesiveness to the transparent substrate of the heat-ray shielding film may not be sufficient. For this reason, when the polyvinyl acetal resin is used, it is preferable to further add a plasticizer.

In contrast, when a thermoplastic resin is to be used that is superior in flexibility and adhesiveness to the transparent substrate due to the property of the resin itself, or when a thermoplastic resin is to be used for which flexibility and adhesiveness to the transparent substrate are improved by copolymerization, etc., a plasticizer may not be added.

As a plasticizer, a material may be used that is generally used as a plasticizer for the thermoplastic resin included in the heat-ray shielding film according to the embodiment. For example, as a plasticizer used for a heat-ray shielding film including a polyvinyl acetal resin as a main component, there are a plasticizer that is a compound of a monohydric alcohol and an organic acid ester, an ester-based plasticizer, such as a polyhydric alcohol organic acid ester compound, and a phosphate acid-based plasticizer, such as an organic phosphate acid-based plasticizer. It is preferable that each of the plasticizers is a liquid at a room temperature. In particular, a plasticizer may preferably be an ester compound synthesized from a polyhydric alcohol and a fatty acid.

The ester compound synthesized from a polyhydric alcohol and a fatty acid is not particularly limited; however, for example, there is a glycol-based ester compound that is obtained by a reaction between a glycol, such as triethylene glycol, tetraethylene glycol, and tripropylene glycol, and a monobasic organic acid, such as butyric acid, isobutyric acid, caproic acid, 2-ethylbutyric acid, heptylic acid, n-octylic acid, 2-ethylhexylic acid, pelargonic acid (n-nonylic acid), and decyl acid.

Among these, a fatty acid ester of triethylene glycol is preferable, such as triethylene glycol dihexanate, triethylene glycol di-2-ethyl butyrate, triethylene glycol di-octanate, and triethylene glycol di-2-ethyl hexanoate. A fatty acid ester of triethylene glycol has various properties, such as compatibility with polyvinyl acetal and cold resistance, in a well-balanced manner, and is superior in processability and economical aspects.

In particular, a plasticizer may preferably have low hydrolyzability. From this perspective, triethylene glycol di-2-ethyl hexanoate, triethylene glycol di-2-ethyl butyrate, and tetraethylene glycol di-2-ethyl hexanate are preferable.

Additionally, if desired, a dye compound or a pigment compound for providing a suitable color tone may be added, which is used, in general, for coloring a thermoplastic resin, such as an azo-based dye, a cyanine-based dye, a quinoline type, a perylene-based dye, and a carbon black.

In order to obtain a higher heat-ray shielding capability, another infrared absorbing material may be added. The other infrared absorbing material is not particularly limited; however, for example, a material is preferable that can absorb light in a wavelength region that is different from that of the composite tungsten oxide particles, which are used. As another infrared absorbing material, for example, an infrared absorbing organic compound may preferably be used. By adding an infrared absorbing organic compound, a higher heat-ray shielding capability can be obtained.

If desired, the heat-ray shielding film according to the embodiment may further include an adhesiveness adjusting agent.

The adhesiveness adjusting agent is not particularly limited; however, for example, alkali metal salt and/or alkaline earth metal salt can preferably be used. An acid forming alkali metal salt and/or alkaline earth metal salt is not particularly limited; and, for example, carboxylic acids, such as octylic acid, hexylic acid, butyric acid, acetic acid, and formic acid, or inorganic acids, such as hydrochloric acid and nitric acid, may be considered. Among alkali metal salts and/or alkaline earth metal salts, magnesium carboxylate with a carbon number from 2 through 16 and potassium carboxylate with a carbon number from 2 through 16 are preferable.

The magnesium carboxylate salt and the potassium carboxylate that are organic acids with carbon numbers from 2 through 16, respectively, are not particularly limited; however, for example, magnesium acetate, potassium acetate, magnesium 2-ethylbutyrate, magnesium propionate, potassium propionate, magnesium 2-ethylbutanoate, potassium 2-ethylbutanoate, magnesium 2-ethylhexanoate, potassium 2-ethylhexanoate, etc., can preferably be used.

Among these, magnesium 2-ethylbutyrate is preferable because it has high performance as an adhesiveness adjusting agent. Furthermore, for example, when the heat-ray shielding film includes a polyvinyl acetal resin as a main component of the thermoplastic resin, magnesium 2-ethyl butyrate can exhibits an effect of enhancing the light resistance of the composite tungsten oxide particles, so that it is preferable also from this perspective.

Note that, only one type of adhesiveness adjusting agent may be added, or two or more types may be added.

As another additive, for example, there are surfactants, antistatic agents, and so forth.

The heat-ray shielding film described above may preferably have high transparency and a high heat-ray shielding capability. The transparency and the heat-ray shielding capability, i.e., the heat shielding property of the heat-ray shielding film can be evaluated by the visible light transmittance and the solar radiation transmittance, respectively.

The degrees of transparency and the heat-ray shielding capability required for the heat-ray shielding film according to the embodiment is not particularly limited; and the performance may preferably be adjusted in accordance with an application, etc., of the heat-ray shielding film.

Specifically, for example, when it is used for an application, such as a window material, from a perspective of ensuring the light transmittance to human eyes, the visible light transmittance may preferably be high, and, from a perspective of reducing incidence of heat by sunlight, the solar radiation transmittance may preferably be low.

Alternatively, when the heat-ray shielding film and the laminated transparent substrate according to the embodiment is used as an agricultural sheet, from a perspective of ensuring the transmittance of visible light required for growth of plants, the visible light transmittance may preferably high, and, from a perspective of reducing incidence of heat by sunlight, the solar radiation transmittance may preferably be low.

More specifically, for example, when the laminated transparent substrate including the heat-ray shielding film according to the embodiment is used as a window material of a building or an automobile, the heat-ray shielding film may preferably have properties such that the visible light transmittance is greater than or equal to 70% and the solar radiation transmittance is less than or equal to 50%. In particular, it is more preferable that the visible light transmittance is greater than or equal to 70% and the solar radiation transmittance is less than or equal to 40%. Note that the visible light transmittance and the solar radiation transmittance are specified by JIS R 3106.

The visible light transmittance and the solar radiation transmittance can be adjusted to be within desired ranges, respectively, for example, by adjusting an addition amount of the composite tungsten oxide particles, etc., included in the heat-ray shielding film according to the embodiment.

Furthermore, in the heat-ray shielding film according to the embodiment, by including the metal coupling agent, the light coloring phenomenon can be suppressed. The degree of suppression of the light coloring phenomenon can be evaluated based on, for example, a change in the total light transmittance after irradiating strong ultraviolet light for a long time. It is preferable that, in the heat-ray shielding film according to the embodiment, a difference be small between values of the total light transmittance prior to and after irradiating ultraviolet light with intensity of 100 mW/cm² for 16 hours using a metal halide lamp as a light source under an environment such that a temperature is 60° C. and a relative humidity is 35%, for example. Note that the total light transmittance is specified by JIS K 7361-1.

For the heat-ray shielding film according to the embodiment, high light resistance can be obtained by including the metal coupling agent. Accordingly, even if the heat-ray shielding film according to the embodiment is placed under strong irradiation of ultraviolet light for a long time, occurrence of a light coloring phenomenon can be suppressed. Furthermore, high transmittance for the light in the visible region can be maintained, and it can be suppressed that the appearance of the heat-ray shielding film is damaged and the transparency is lowered.

Furthermore, as the heat-ray shielding film according to the embodiment includes the composite tungsten oxide particles as infrared absorbing particles, it can exhibit high heat-ray shielding capability while ensuring high visible light transmittance. For this reason, when it is applied, for example, to an window of an automobile or a building, comfort of the automobile or the building can be enhanced, and fuel efficiency can be enhanced by reducing the load on an air conditioner in the automobile, or energy reduction, etc., can be achieved by reducing the load on an air conditioner in the building.

A mode of use of the heat-ray shielding film according to the embodiment is not particularly limited, and, for example, it can be used alone. When the heat-ray shielding film is used alone, for example, it can be used as a film for covering an outer surface of a vinyl house, or it can be used as a film for partitioning a region at which transmission of heat rays is desired to be suppressed.

Furthermore, the heat-ray shielding film according to the embodiment may be used while being disposed on one surface or both surfaces of a transparent substrate, such as an inorganic glass or a transparent resin. Specifically, for example, the heat-ray shielding film according to the embodiment may be pasted on one principal plane or both principal planes of one sheet of transparent substrate to be used.

As another mode, by disposing the heat-ray shielding film according to the embodiment between a plurality of transparent substrates arrange to face each other, a heat-ray shielding laminated transparent substrate may be obtained. The heat-ray shielding laminated transparent substrate is described below.

(Method for Manufacturing the Heat-Ray Shielding Film)

Next, an example of a configuration of a method for manufacturing the heat-ray shielding film according to the embodiment is described. Note that, by the method for manufacturing the heat-ray shielding film according to the embodiment, the above-described heat-ray shielding film can favorably be manufactured. Accordingly, points other than the points described below can be configured to be the same as those of the above-described heat-ray shielding film, and the descriptions are omitted.

The method for manufacturing the heat-ray shielding film according to the embodiment is not particularly limited; however, the following processes may be included.

A dispersion liquid manufacturing process for manufacturing a dispersion liquid which is obtained by dispersing the composite tungsten oxide particles, a metal coupling agent, and a dispersant in an organic solvent.

A dispersoid manufacturing process of manufacturing a dispersoid of the composite tungsten oxide particles in a state where the composite tungsten oxide particles are dispersed in a solid dispersant and the metal coupling agent is included (dispersed or dissolved) by removing the organic solvent in the dispersion liquid manufactured by the dispersion liquid manufacturing process. A mixing process of mixing the dispersoid of the composite tungsten oxide particles including the metal coupling agent, which is obtained by the dispersoid manufacturing process, and a thermoplastic resin.

A molding process of molding the mixture of the dispersoid of the composite tungsten oxide particles and the thermoplastic resin.

Note that, in the mixing process, the dispersion liquid of the composite tungsten oxide particles and the thermoplastic resin may be mixed, by supplying the dispersion liquid manufactured by the dispersion liquid manufacturing process to the mixing process without executing the dispersoid manufacturing process. In this case, by the mixing process, the composite tungsten oxide particles can be uniformly dispersed in the thermoplastic resin, while the organic solvent being removed. However, from a perspective of reliably preventing that a large amount of the organic solvent and bubbles from remaining in the heat-ray shielding film, and from a perspective of safety of preventing a large amount of the organic solvent from being exposed to a high temperature during mixing of the resin that exceeds 200° C., it is preferable to execute the dispersoid manufacturing process prior to the mixing process.

Furthermore, the metal coupling agent may not be added in the above-described dispersion liquid manufacturing process, and the metal coupling agent may be added in the mixing process. Namely, the molding process may be executed after a mixing process of mixing the dispersoid of the composite tungsten oxide particles that does not includes the metal coupling agent, the metal agent, and the thermoplastic resin.

Each of the processes is described.

First, the dispersion liquid manufacturing process is described.

In the dispersion liquid manufacturing process, the composite tungsten oxide particles, the metal coupling agent, and the dispersant are added to and mixed with the organic solvent, and an organic solvent dispersion of the composite tungsten oxide particles can be obtained by a generic dispersion method. The dispersion method is not particularly limited; however, dispersion methods, such as a bead mill, a ball mill, a sand mill, ultrasonic dispersion, and a paint shaker, can be used.

The composite tungsten oxide particles, the metal coupling agent, and the dispersant, which can be preferably used in the dispersion liquid manufacturing process, are already described for the heat-ray shielding film, and the description is omitted.

The type of the organic solvent used for the dispersion liquid manufacturing process is not particularly limited; however, for example, an organic solvent with a boiling point that is less than or equal to 120° C. may preferably be used. The reason is that, when the boiling point is less than or equal to 120° C., the organic solvent can be easily removed in the subsequent dispersoid manufacturing process, etc. By rapidly removing the organic solvent in the dispersoid manufacturing process, etc., the productivity of the dispersant of the composite tungsten oxide particles can be enhanced. Further, as the dispersoid manufacturing process is easily and sufficiently progressed, it can be avoided that the excessive organic solvent remains in the dispersant of the composite tungsten oxide particles. As a result, occurrence of a failure, such as generation of bubbles in the heat-ray shielding film, in the molding process can be more reliably avoided.

Specifically, for example, toluene, methyl ethyl ketone, methyl isobutyl ketone, butyl acetate, isopropyl alcohol, ethanol, and so forth can be suitably used as the organic solvent; however, the organic solvent is not limited these. It can preferably be used, if its boiling point is less than or equal to 120° C., and it can uniformly disperse the composite tungsten oxide particles.

The addition amount of the organic solvent is not particularly limited, and the addition amount can be freely selected, so that the dispersion liquid can be formed depending on the addition amounts of the composite tungsten oxide particles and the dispersant.

Note that the addition amount of the dispersant is not limited. For example, it may preferably be added so that it is greater than or equal to 10 parts by mass and less than or equal to 1000 parts by mass with respect to 100 parts by mass of the composite tungsten oxide particles, and it may more preferably be added so that it is greater than or equal to 30 parts by mass and less than or equal to 400 parts by mass. It is not necessary to add the total amount of the dispersant during manufacturing of the dispersant in the dispersion liquid manufacturing process. For example, considering the viscosity, etc., of the dispersant, after forming the dispersant by the already described method for dispersing the mixture of a part of the total added amount of the dispersant, the composite tungsten oxide particles, the metal coupling agent, and the organic solvent, the remaining part of the dispersant may further be added.

Furthermore, the addition amount of the metal coupling agent is not particularly limited; however, for example, it may be preferably added, so that it is greater than or equal to 1 part by mass and less than or equal to 100 parts by mass with respect to 100 parts by mass of the composite tungsten oxide particles, and it is more preferable that the added amount be greater than or equal to 5 parts by mass and less than or equal to 40 parts by mass. The reason is that, if the addition amount is greater than or equal to 1 part, the metal coupling agent can be included in the thermoplastic resin with concentration sufficient for exhibiting the effect of suppressing the light coloring phenomenon during mixing of the dispersant of the composite tungsten oxide particles in the thermoplastic resin in the mixing process. Additionally, if it is less than or equal to 100 parts by mass, the metal coupling agent does not precipitate in the thermoplastic resin during mixing the dispersoid of the composite tungsten oxide particles in the thermoplastic resin in the mixing process, and it does not provide any significant effect on the strength, the adhesiveness, and the penetration resistance of the film.

It is not necessary to add the total amount of the metal coupling agent during manufacturing the dispersion liquid in the dispersion liquid manufacturing process.

The dispersion liquid manufacturing process may include one process; however, it may include a plurality of processes.

When the dispersion liquid manufacturing process includes a plurality of processes, specifically, for example, a first dispersion liquid manufacturing process may be executed that is for manufacturing a partial dispersion liquid in which the composite tungsten oxide particles and the dispersant are dispersed in an organic solvent. Then, a second dispersion liquid manufacturing process may be executed that is for manufacturing a dispersion liquid by adding a metal coupling agent to the partial dispersion liquid manufactured by the first dispersion liquid manufacturing process, and by mixing them.

Furthermore, as already described, it is not necessary to add all of the dispersant at once. Accordingly, for example, in the above-described first dispersion liquid manufacturing process, a part of the total addition amount of the dispersant may be added to manufacture the partial dispersion liquid, and, after that, a dispersant addition process may be executed that is for adding the remaining dispersant to the partial dispersant liquid, and for mixing them. Then, in the second dispersion liquid manufacturing process, the metal coupling agent may be added to the partial dispersion liquid to which the dispersant is added in the dispersant addition process to mix them.

Further, for example, considering viscosity, etc., of the dispersant, first, in the above-described first dispersion liquid manufacturing process, a partial dispersion liquid may be formed by applying the already described dispersion method to the mixture of a part of the total addition amount of the metal coupling agent, the composite tungsten oxide particles, the dispersant, and the organic solvent. Then, in the second dispersion liquid manufacturing process, the dispersion liquid may be manufactured by further adding the remaining part of the metal coupling agent to mix it. Note that, in this case, the dispersant may be added in a plurality of divided steps; and, for example, a part of the total addition amount may be added in the first dispersion liquid manufacturing process, and a dispersant addition process may further be provided that is for adding the dispersant to the obtained partial dispersion liquid to mix them.

Next, the dispersoid manufacturing process is described.

In the dispersoid manufacturing process, if desired, a further appropriate amount of dispersant may be added to the dispersion liquid in which the composite tungsten oxide particle, the metal coupling agent, and the dispersant are dispersed in the organic solvent; and then, by removing the organic solvent, a dispersoid of the composite tungsten oxide particles can be manufactured. The method is not particularly limited that is for removing the organic solvent from the dispersion liquid in which the composite tungsten oxide particles, the metal coupling agent, and the dispersant are dispersed in the organic solvent; however, for example, vacuum drying may preferably be used. Specifically, by vacuum drying the dispersion liquid, in which the composite tungsten oxide particles and the dispersant are dispersed in the organic solvent, while stirring the dispersion liquid, the dispersoid of the composite tungsten oxide particles and the component of the organic solvent can be separated. As a device used for vacuum drying, for example, there is a vacuum stirring dryer; however, it suffices if the device is provided with the above-described function, and the device is not particularly limited. Furthermore, the specific depressurization pressure for removing the organic solvent is not particularly limited, and it can be appropriately selected.

It is preferable to use the vacuum drying method in the dispersoid manufacturing process because the efficiency for removing the organic solvent can be enhanced, and condensation of the dispersoid of the composite tungsten oxide particles; which is dispersed, does not occur, as the dispersoid of the composite tungsten oxide particles are not exposed to a high temperature for a long time. Additionally, it is preferable from the perspective of environmental consideration because the productivity is increased, and it is easy to collect the evaporated organic solvent.

In the dispersoid manufacturing process, it is preferable to remove the organic solvent so that the organic solvent included in the dispersoid becomes less than or equal to 10 parts by mass, and it is more preferable to remove the organic solvent so that it becomes less than or equal to 5 parts by mass. The reason is that, when the remaining amount of the organic solvent is less than or equal to 10 parts by mass, the odor due to the organic solvent volatilized from the dispersoid can be reduced, it can be absolutely prevented that a large amount of the organic solvent and bubbles remain in the heat-ray shielding film in the below-described mixing process, and it can further be prevented that a large amount of the organic solvent is exposed to a high temperature for mixing the resin, which exceeds 200° C.

Next, the mixing process is described.

In the mixing process, the dispersoid of the composite tungsten oxide particles obtained by the dispersoid manufacturing process and the thermoplastic resin can be mixed. At this time, depending on the necessity, other additives to be added to the heat-ray shielding film, such as an ultraviolet absorbing agent, HALS, an antioxidant, and an infrared absorbing organic compound, may be added, and these may be mixed together. Note that the timing for adding these additives is not particularly limited; and, for example, they may be added in another process, such as the dispersion liquid manufacturing process. The mixing method is not particularly limited; and a known resin mixing method may be freely selected to be used.

Next, the molding process is described.

The molding process is a process for molding the mixture obtained by the mixing process. The molding method is not particularly limited, and it can be freely selected depending on the size, e.g., a thickness, and the shape of the heat-ray shielding film to be manufactured and viscosity, etc., of the mixture. For example, an extrusion molding method, a calendar molding method, etc., may be adopted.

Further, a shape of a molded body is not particularly limited, and the shape can be selected depending on a shape required for the heat-ray shielding film. For example, it can be molded to have a film shape.

(A Heat-Ray Shielding Laminated Transparent Substrate, a Method of Manufacturing the Heat-Ray Shielding Laminated Transparent Substrate, an Automobile, and a Building)

Next, examples of configurations of the heat-ray shielding laminated transparent substrate and the method of manufacturing the heat-ray shielding laminated transparent substrate according to the embodiment are described.

The heat-ray shielding laminated transparent substrate according to the embodiment may include the above-described heat-ray shielding film, and its specific mode is not particularly limited; however, for example, the heat-ray shielding laminated transparent substrate according to the embodiment can be configured such that it includes a plurality of transparent substrates and the above-described heat-ray shielding film, and the heat-ray shielding film is disposed between the plurality of transparent substrates.

At this time, the type of the transparent substrate to be used is not particularly limited, and it can be freely selected depending on a use of the heat-ray shielding laminated transparent substrate. For example, a glass substrate and various types of resin substrates may preferably be used. Furthermore, all of the plurality of transparent substrate may be formed of the same material; however, substrates formed of respective different materials may be combined to be used.

However, as for the substrates used for the heat-ray shielding laminated transparent substrate according to the embodiment, for example, at least one of the plurality of transparent substrates may preferably be a glass substrate because of its high light resistance and high visible light transmittance. Further, all of the plurality of transparent substrate may be glass substrates. For example, in particular, a heat-ray shielding laminated transparent substrate (heat-ray shielding laminated glass) in which a glass substrate formed of inorganic glass is used can preferably be used as a glass for the front of an automobile or a window of a building.

Note that, when the heat-ray shielding laminated transparent substrate includes three or more transparent substrates, there are two or more gaps between the transparent substrates. In this case, among these gaps between the transparent substrates, the heat-ray shielding film may be disposed between selected one or more gaps between the transparent substrates; and there may be a gap between the transparent substrates in which no heat-ray shielding film is disposed, or the heat-ray shielding film may be disposed in all the gaps between the transparent substrates. When there is a gap between the transparent substrates in which no heat-ray shielding film is disposed, the configuration of the gap between the transparent substrates is not particularly limited; and, for example, an interlayer provided with a function that is different from that of the above-described heat-ray shielding film may be disposed, the gap between the transparent substrates may be vacuum, or a gas with low thermal conductivity may be sealed to enhance the heat insulation performance.

Further, the heat-ray shielding film may be disposed between the transparent substrates alone; however, as described below, a multilayer film may be formed by the heat-ray, shielding film and another film to be disposed between the transparent substrates.

The heat-ray shielding laminated transparent substrate according to the embodiment may be obtained, for example, by laminating and integrating a plurality of transparent substrates facing each other while nipping the above-described heat-ray shielding film to be included by a known method.

For manufacturing the heat-ray shielding transparent substrate, one or more interlayers, such as another resin interlayer, together with the above-described heat-ray shielding film may be nipped between the transparent substrates. By using, as the other interlayer, an intermediate film having a function, such as an ultraviolet ray cutting function, a sound insulation function, a toning function, and an adhesiveness adjusting function, a more highly functional heat-ray shielding laminated transparent substrate may be achieved.

Furthermore, a heat-ray shielding laminated transparent substrate may be obtained in which the above-described heat-ray shielding film and an infrared reflecting film are combined and used. Namely, it can be configured such that at least one infrared reflecting film is further disposed between the plurality of transparent substrates.

When the heat-ray shielding film and the infrared reflecting film are combined and used, for example, the infrared reflecting film may be nipped between the infrared shielding film according to the embodiment and a transparent resin film to integrate these, and thereby a multilayer film may be obtained. Then, the heat-ray shielding laminated transparent substrate may be obtained by nipping multilayer film including the infrared reflecting film and the heat-ray shielding film according to the embodiment between the plurality of transparent substrates facing each other, such as glass substrates formed of inorganic glass, etc., and a transparent resin substrates, and by laminating and integrating them by a known method.

At this time, the positional relation between the heat-ray shielding film and the infrared reflecting film is not particularly limited, and it can be freely selected depending on an environment to be used, etc. For example, when the heat-ray shielding laminated transparent substrate is to be used for a window of an automobile or a building, it may be preferable to configure so that the infrared reflecting film is positioned outside the heat-ray shielding film, in consideration of the temperature rise suppression effect inside the automobile or inside the room.

The property of the infrared reflecting film described above is not particularly limited; and it can be freely selected depending on the performance which is required for the heat-ray shielding laminated transparent substrate.

However, considering the heat-ray shielding capability, when the infrared reflecting film is laminated on the transparent substrate, the infrared reflection film may preferably reflect the light mainly from the long wavelength region of the visible light to the near-infrared region, e.g., a wavelength range from 700 nm to 1200 nm.

In this manner, when the infrared reflecting film strongly reflects the wavelength from 700 nm to 1200 nm, for which light absorption by the composite tungsten oxide particles is weak, the composite tungsten oxide and the infrared reflecting film can shield the near-infrared region complementarily and widely. Accordingly, the heat-shielding property of the heat-shielding laminated transparent substrate can further be enhanced.

In particular, when the infrared reflecting film is laminated on the transparent glass substrate, it is preferable that the maximum value of the reflectance of the infrared reflecting film with respect to the light with the wavelength from 700 nm to 1200 nm be greater than or equal to 30% and less than or equal to 100%, more preferably greater than or equal to 50% and less than or equal to 100%.

Further, considering the transmittance of the light in the visible region, the infrared reflecting film may preferably have approximately no sunlight absorption in the visible region. In particular, when the infrared reflecting film is laminated on the transparent substrate, the visible light transmittance may preferably be greater than or equal to 80%, more preferably greater than or equal to 85%.

It is preferable that the infrared reflecting film have both the heat-ray shielding capability and the transmittance for the light in the visible region. For this reason, when the infrared reflecting film is laminated on the transparent substrate, the visible light transmittance may preferably be greater than or equal to 80%, and the maximum value of the reflectance with respect to the light with the wavelength from 700 nm to 1200 nm may preferably be greater than or equal to 30% and less than or equal to 100%. In particular, when the infrared reflecting film is laminated on the transparent substrate, the visible light transmittance may more preferably be greater than or equal to 85%, and the maximum value of the reflectance with respect to the light with the wavelength from 700 nm to 1200 nm may more preferably be greater than or equal to 50% and less than or equal to 100%.

Furthermore, when the heat-ray shielding laminated transparent substrate is to be used for an application in which transmittance of an electromagnetic wave in a predetermined wavelength range is required, such as a windshield of an automobile or a window of a building, the infrared reflecting film may preferably transmit an electromagnetic wave in a wavelength region used for a mobile phone and ETC.

When it is required to transmit a radio wave, etc., of a mobile phone as described above, as an infrared reflecting film, a film that transmits a radio wave is more preferable compared to a film provided with a metal film with conductivity that does not transmit a radio wave in the above-described wavelength region. Specifically, for example, a film that transmits a radio wave can preferably be used, such as a film with a property of reflecting infrared by a multi-layer film in which resins with different refractive indexes are alternatively laminated, or a film with a property of reflecting infrared by a cholesteric liquid crystal.

The heat shielding property of the heat-ray shielding laminated transparent substrate according to the embodiment is represented by solar radiation transmittance with respect to the visual light transmittance. As the solar radiation transmittance relative to the visible light transmittance becomes lower, the heat shielding property of the heat-ray shielding laminated transparent substrate becomes better. Specifically, for example, when the addition amount, etc., of the composite tungsten oxide to the heat-ray shielding film is selected so that the visible light transmittance of the heat-ray shielding laminated transparent substrate becomes 70%, the solar radiation transmittance of the heat-ray shielding laminated transparent substrate may preferably be less than or equal to 50%, more preferably less than or equal to 40%.

When the heat-ray shielding laminated transparent substrate is used, for example, as a window material of a windshield of an automobile, it is required to satisfy the condition that the visible light transmittance is greater than or equal to 70%, which is specified by the Road Vehicles Act; and, at the same time, it may preferably have high heat-ray shielding capability. Accordingly, for example, when the visible light transmittance of the heat-ray shielding laminated transparent substrate is 70% as described above, the solar radiation transmittance may preferably be less than or equal to 50%, more preferably less than or equal to 40%.

In particular, for the heat-ray shielding laminated transparent substrate according to the embodiment, the visible light transmittance may preferably be greater than or equal to 70% and the solar radiation transmittance may preferably be less than or equal to 50%. Further, the visible light transmittance may more preferably be greater than or equal to 70%, and the solar radiation transmittance may more preferably be less than or equal to 40%.

By using the heat-ray shielding laminated transparent substrate provided with the high heat-ray shielding capability, especially for an automobile using a battery, such as a hybrid car or an electric car, a significant effect can be seen, such as extending the cruising distance, as the consumption of the battery energy can be suppressed. Accordingly, as it can be expected to contribute to enhancement of fuel consumption and reduction of greenhouse gas emissions of an automobile, it can be expected that that the heat-ray shielding laminated transparent substrate becomes an indispensable component for designing an automobile in the feature.

When the heat-ray shielding laminated transparent substrate is used, for example, as a window material of an automobile or a building, it may preferably have a natural color tone, namely, close to transparent or achromatic color. In particular, assuming that the heat-ray shielding laminated transparent substrate according to the embodiment is used as a windshield, etc., of an automobile, in order to ensure safety during driving, a color of a see-through image can preferably be normally recognized.

For this reason, when it is used for such an application, it is preferable that a color of a see-through image can be normally recognized, for example, in a color recognition test based on JIS R 3211 and JIS R 3212, which specify the performance required for laminated glass for an automobile, using the heat-ray shielding film used for the heat-ray shielding laminated transparent substrate.

The heat-ray shielding laminated transparent substrate according to the embodiment can be used for various types of applications. As described above, the window material including the heat-ray shielding laminated transparent substrate can favorably be used for a window of an automobile or a building. Specifically, for example, an automobile in which the window material including the heat-ray shielding laminated substrate is installed and a building provided with the window material including the heat-ray shielding laminated substrate can be obtained.

The method of manufacturing the heat-ray shielding transparent substrate according to the embodiment is not particularly limited; and there may be a laminating process of disposing an interlayer including the above-described heat-ray shielding film between the transparent substrates and laminating the transparent substrates and the interlayer including the heat-ray shielding film.

The method of laminating the transparent substrate and the heat-ray shielding film is not particularly limited; and various types of methods, such as a method of laminating by using an adhesive and a method of thermocompression bonding, may be used.

Further, the interlayer including the heat-ray shielding film may be a single film formed of a heat-ray shielding film. For example, as described above, it may be a film (layer) which is laminated and integrated with another film, such as the multilayer film in which the infrared reflecting film and the heat-ray shielding film are integrated.

As the heat-ray shielding laminated transparent substrate according to the embodiment is provided with the heat-ray shielding film with the above-described high light resistance, even if the heat-ray shielding laminated transparent substrate according to the embodiment is placed under an environment in which it is irradiated by ultraviolet rays and solar light for a long time, occurrence of the light coloring phenomenon can be suppressed. Consequently, it can be suppressed that the appearance of the heat-ray shielding laminated transparent substrate is damaged or the transparency is lowered.

Furthermore, as the heat-ray shielding laminated transparent substrate according to the embodiment is provided with the above-described heat-ray shielding film and the heat-ray shielding film includes the composite tungsten oxide particles as the infrared absorbing particles, it can exhibit high heat-ray shielding capability while maintaining high visible light transmittance. Accordingly, for example, when it is applied to a window of an automobile or a building, comfortableness in the automobile or the building can be enhanced, and the fuel efficiency of the automobile can be enhanced by reducing the load on the air conditioner or energy can be saved in the building by reducing the load on the air conditioner.

(The Dispersoid, the Mixed Composition, and the Method for Producing the Dispersoid)

Next, examples of the configurations of the dispersoid and the method for producing the dispersoid according to the embodiment are described.

Note that the dispersoid according to the embodiment can be obtained by executing the above-described process of manufacturing the heat-ray shielding film, specifically, for example, by executing the process up to the dispersoid manufacturing process. Accordingly, points other than the points described below can be similarly configured as the above-described heat-ray shielding film and the method of manufacturing the heat-ray shielding film, so that a part of the description is omitted.

The dispersoid according to the embodiment may include composite tungsten oxide particles, a dispersant, and a metal coupling agent.

As the composite tungsten oxide particles, composite tungsten oxide particles represented by a general formula $M_xWO_y$ (where, M is one or more elements selected from Cs, Rb, K, Tl, In, Ba, Li, Ca, Sr, Fe, Sn, Al, Cu, and Na, $0.1 \leq x \leq 0.5$, and $2.2 \leq y \leq 3.0$) can be used.

As described above, the dispersoid according to the embodiment can be formed into a heat-ray shielding film by mixing it with the thermoplastic resin, etc., and by molding them. Then, as the dispersoid according to the embodiment includes the metal coupling agent, when it is formed into the heat-ray shielding film by mixing it with the thermoplastic resin, etc., and by molding them, occurrence of the light coloring phenomenon can be suppressed.

As described above, the dispersoid according to the embodiment can be formed into the heat-ray shielding film by mixing it with the thermoplastic resin, etc., and by molding them. Here, the content of the organic solvent in the dispersoid according to the embodiment may preferably be low. Specifically, for example, the content of the organic solvent in the dispersoid according to the embodiment may preferably be less than or equal to 10% by mass, more preferably less than or equal to 5% by mass.

The reason is that, by adjusting the remaining amount of the organic solvent to be less than or equal to 10 parts by mass, when it is mixed with the thermoplastic resin, the odor due to the organic solvent volatilized from the dispersoid can be reduced, and it can be absolutely prevented that a large amount of the organic solvent and bubbles remain in the thermoplastic resin. Furthermore, it is preferable because it can be prevented that a large amount of the organic solvent is exposed to a high temperature for mixing the dispersoid according to the embodiment with the resin.

For the composite tungsten oxide particle, the dispersant, and the metal coupling agent included in the dispersoid according to the embodiment, the materials described for the heat-ray shielding film can preferably be used.

Note that, as described above, as the composite tungsten oxide particles, composite tungsten oxide particles represented by a general formula $M_xWO_y$ (where, M is one or more elements selected from Cs, Rb, K, Ti, In, Ba, Li, Ca, Sr, Fe, Sn, Al, Cu, and Na, $0.1 \leq x \leq 0.5$, and $2.2 \leq y \leq 3.0$) can be used.

The composite tungsten oxide particles may be crystalline or amorphous, and when it is crystalline, the crystal system is not particularly limited. However, the composite tungsten oxide particles with hexagonal crystals can enhance the transmittance of the visible light and the absorption of the near-infrared light. For this reason, it is preferable that the crystal system of the composite tungsten oxide of the composite tungsten oxide particles included in the dispersoid according to the embodiment be the hexagonal crystal.

For example, when Cs and/or Rb is used as the element M, the crystal structure of the composite tungsten oxide tends to be a hexagonal crystal. Furthermore, as the transmittance of the light in the visible region becomes high and the transmittance of the light in the infrared region, particularly in the near-infrared region becomes low, the contrast between the transmittance of the light in the visible region and the transmittance of the light in the infrared region becomes large. For this reason, it is more preferable that the element M in the general formula $M_xWO_y$, which indicates the composite tungsten oxide, be Cs and/or Rb. In particular, when the element M includes Cs, the light resistance of the composite tungsten oxide becomes higher, so that it is particularly preferable that the M include Cs.

The particle size of the composite tungsten oxide particles is not particularly limited, and it can be freely selected depending on an application for which the dispersoid or the heat-ray shielding film molded from the dispersoid is used. For example, when the heat-ray shielding film is to be used for an application in which particularly high transparency is required for the light in the visible region, the composite tungsten oxide particles may preferably be fine particles, and the volume average particle size of the composite tungsten oxide particles may preferably be less than or equal to 100 nm. The reason is that, when the volume average particle size of the composite tungsten oxide particles is less than or equal to 100 nm, in the heat-ray shielding film in which the dispersoid according to the embodiment is used, it can be suppressed that the light is shielded by scattering of the light. Accordingly, the transparency can be efficiently maintained, while maintaining the visibility in the visible region.

Furthermore, when the heat-ray shielding film formed by using the dispersoid according to the embodiment is to be used for an application in which the transparency in the visible region is particularly emphasized, such as a roof or a side window of an automobile, it is preferable to consider further reduction of the scattering caused by the composite tungsten oxide particles. When the further reduction of the scattering is to be considered, the volume average particle size of the composite tungsten oxide particles may preferably be less than or equal to 40 nm, more preferably less than or equal to 30 nm, and particularly preferably less than or equal to 25 nm.

However, when the volume average particle size of the composite tungsten oxide particles is too small, it may become difficult to handle the heat-ray shielding film during manufacturing it, or condensation may be caused in the heat-ray shielding film. Accordingly, the volume average particle size of the composite tungsten oxide particles may preferably be greater than or equal to 1 nm.

The metal coupling agent is not particularly limited; however, as described above, for example, a silane coupling agent, a titanate coupling agent, an aluminate coupling agent, and so forth can be used. Note that the metal coupling agent to be added to the heat-ray shielding film is not limited to one type, and two or more types of metal coupling agents may be added at the same time.

In particular, the silane coupling agent can preferably be used as the metal coupling agent. It is preferable that the metal coupling agent include the silane coupling agent, and it is more preferable that the metal coupling agent be the silane coupling agent. Note that, even if the metal coupling agent is the silane coupling agent, the metal coupling agent used for the heat-ray shielding film is not limited to the one type of the silane coupling agent, and one type or two or more types of silane coupling agents may be added at the same time.

Further, depending on the type of the compound of the metal coupling agent, when the heat-ray shielding film is formed, the dispersibility of the composite tungsten oxide particles may be enhanced, and the transparency of the heat-ray shielding film may be enhanced. The reason is that a functional group included in the metal coupling agent may adsorb to the composite tungsten oxide particles, and condensation with any other composite tungsten oxide particles may be prevented due to steric hindrance. In this case, depending on the addition of the compound, both the above-described effect caused by the addition of the metal coupling agent and the effect caused by addition of a dispersant may be obtained. For example, as the metal coupling agent that exhibits such an effect, there is a metal coupling agent that includes an epoxy group and/or an amino group in its structure. Accordingly, the metal coupling agent may preferably include an epoxy group and/or an amino group.

The dispersant is already described, and thus the description is omitted here.

The ratios of the components included in the dispersoid are not particularly limited, and they can be freely selected.

The dispersoid according to the embodiment may preferably include, for example, the dispersant with a ratio such that the dispersant is greater than or equal to 10 parts by mass and less than or equal to 1000 parts by mass with respect to the 100 parts by mass of the composite tungsten oxide particles, and the dispersoid according to the embodiment may be more preferably include the dispersant so that it is greater than or equal to 30 parts by mass and less than or equal to 400 parts by mass.

Further, the dispersoid according to the embodiment may preferably include the metal coupling agent, for example, with a ratio such that it is greater than or equal to 1 part by mass and less than or equal to 100 parts by mass relative to 100 parts by mass of the composite tungsten oxide particles, and may more preferably include the metal coupling agent so that it is greater than or equal to 5 parts by mass and less than or equal to 40 parts by mass.

The dispersoid according to the embodiment is briefly described above. As described above, the dispersoid according to the embodiment may be formed into the heat-ray shielding film by mixing it with the thermoplastic resin. Accordingly, a mixed composition may be formed that includes the dispersoid according to the embodiment and the thermoplastic resin.

Next, an example of a configuration of the method for manufacturing the dispersoid according to the embodiment is described.

The method for manufacturing the dispersoid according to the embodiment may include the following processes, for example.

It may include a dispersoid manufacturing process for removing, from the dispersion liquid, the organic solvent included in the dispersion liquid. Here, the dispersion liquid includes the composite tungsten oxide particles, the dispersant, the metal coupling agent, and the organic solvent, in which the composite tungsten oxide particles are particles of a composite tungsten oxide represented by a general formula $M_xWO_y$, (where, M is one or more elements selected from Cs, Rb, K, Tl, In, Ba, Li, Ca, Sr, Fe, Sn, Al, Cu, and Na, $0.1 \leq x \leq 0.5$, and $2.2 \leq y \leq 3.0$).

The method for manufacturing the dispersoid according to the embodiment may include a dispersion liquid manufacturing process for manufacturing a dispersion liquid in which the composite tungsten oxide particles, the metal coupling agent, and the dispersant are dispersed in the organic solvent, which is the process for manufacturing the above-described dispersion liquid.

Each of the processes is described in the method of manufacturing the heat-ray shielding film, so that the description is omitted here.

(The Dispersion Liquid and the Method for Manufacturing the Dispersion Liquid)

Next, examples of the configurations of the dispersion liquid according to the embodiment and the method for manufacturing the dispersion liquid are described.

Note that the dispersion liquid according to the embodiment may be obtained by executing the above-described process of manufacturing the heat-ray shielding film, specifically, for example, by executing the processes up to the dispersion liquid manufacturing process. Accordingly, points other than the points described below can be configured to be the same as the above-described heat-ray shielding film and the method for manufacturing the heat-ray shielding film, so that a part of the description is omitted.

The dispersion liquid according to the embodiment may include the composite tungsten oxide particles, the dispersant, the metal coupling agent, and the organic solvent.

As the composite tungsten oxide particles, composite tungsten oxide particles represented by a general formula $M_xWO_y$ (where, M is one or more elements selected from Cs, Rb, K, Tl, In, Ba, Li, Ca, Sr, Fe, Sn, Al, Cu, and Na, $0.1 \leq x \leq 0.5$, and $2.2 \leq y \leq 3.0$) can be used.

After removing the organic solvent to obtain the dispersoid, by mixing it with the thermoplastic resin and molding them, the dispersion liquid according to the embodiment may be formed into the heat-ray shielding film, as described above. Alternatively, without removing the organic solvent, the heat-ray shielding film may be obtained by molding it, after directly mixing it with the thermoplastic resin.

As the dispersion liquid according to the embodiment includes the metal coupling agent, when it is formed into the heat-ray shielding film by the above-described procedure, occurrence of the light coloring phenomenon can be suppressed.

As for the composite tungsten oxide particles, the dispersant, the metal coupling agent, and the organic solvent included in the dispersion liquid according to the embodiment, the materials described for the heat-ray shielding film and the method for manufacturing the heat-ray shielding film can be favorably used.

Note that, as described above, as the composite tungsten oxide particles, composite tungsten oxide particles represented by a general formula $M_xWO_y$ (where, M is one or more elements selected from Cs, Rb, K, Tl, In, Ba, Li, Ca, Sr, Fe, Sn, Al, Cu, and Na, $0.1 \leq x \leq 0.5$, and $2.2 \leq y \leq 3.0$) can be used.

The composite tungsten oxide particles may be crystalline or amorphous, and when it is crystalline, the crystal system is not particularly limited. However, the composite tungsten oxide particles with hexagonal crystals can enhance the transmittance of the visible light and absorption of the near-infrared light. For this reason, it is preferable that the crystal system of the composite tungsten oxide of the composite tungsten oxide particles included in the dispersion liquid according to the embodiment be the hexagonal crystal.

For example, when Cs and/or Rb is used as the element M, the crystal structure of the composite tungsten oxide tends to be a hexagonal crystal. Furthermore, as the transmittance of the light in the visible region becomes high and the transmittance of the light in the infrared region, particularly in the near-infrared region becomes low, the contrast between the transmittance of the light in the visible region and the transmittance of the light in the infrared region becomes large. For this reason, it is more preferable that the element M in the general formula $M_xWO_y$, which indicates the composite tungsten oxide, be Cs and/or Rb. In particular, when the element M includes Cs, the light resistance of the composite tungsten oxide becomes higher, so that it is particularly preferable that the M include Cs.

The particle size of the composite tungsten oxide particles is not particularly limited, and it can be freely selected depending on an application for which the dispersion liquid or the heat-ray shielding film molded from the dispersion liquid is used. For example, when the heat-ray shielding film is to be used for an application in which particularly high transparency is required for the light in the visible region, the composite tungsten oxide particles may preferably be fine particles, and the volume average particle size of the composite tungsten oxide particles may preferably be less than or equal to 100 nm. The reason is that, when the volume average particle size of the composite tungsten oxide particles is less than or equal to 100 nm, in the heat-ray shielding film in which the dispersion liquid according to the embodiment is used, it can be suppressed that the light is shielded by scattering of the light. Accordingly, the transparency can be efficiently maintained, while maintaining the visibility in the visible region.

Furthermore, when the heat-ray shielding film formed by using the dispersion liquid according to the embodiment is to be used for an application in which the transparency in the visible region is particularly emphasized, such as a roof or a side window of an automobile, it is preferable to consider further reduction of the scattering caused by the composite tungsten oxide particles. When the further reduction of the scattering is to be considered, the volume average particle size of the composite tungsten oxide particles may preferably be less than or equal to 40 nm, more preferably less than or equal to 30 nm, and particularly preferably less than or equal to 25 nm.

However, when the volume average particle size of the composite tungsten oxide particles is too small, it may become difficult to handle the heat-ray shielding film during manufacturing it, or condensation may be caused in the heat-ray shielding film. Accordingly, the volume average particle size of the composite tungsten oxide particles may preferably be greater than or equal to 1 nm.

The metal coupling agent is not particularly limited; however, as described above, for example, a silane coupling agent, a titanate coupling agent, an aluminate coupling agent, and so forth can be used. Note that the metal coupling agent to be added to the heat-ray shielding film is not limited to one type, and two or more types of metal coupling agents may be added at the same time.

In particular, the silane coupling agent can preferably be used as the metal coupling agent. It is preferable that the metal coupling agent include the silane coupling agent, and it is more preferable that the metal coupling agent be the silane coupling agent. Note that, even if the metal coupling agent is the silane coupling agent, the metal coupling agent used for the heat-ray shielding film is not limited to the one type of the silane coupling agent, and one type or two or more types of silane coupling agents may be added at the same time.

Further, depending on the type of the compound of the metal coupling agent, when the heat-ray shielding film is formed, the dispersibility of the composite tungsten oxide particles may be enhanced, and the transparency of the heat-ray shielding film may be enhanced. The reason is that a functional group included in the metal coupling agent may adsorb to the composite tungsten oxide particles, and condensation with any other composite tungsten oxide particles may be prevented due to steric hindrance. In this case, depending on the addition of the compound, both the above-described effect caused by the addition of the metal coupling agent and the effect caused by addition of a dispersant may be obtained. For example, as the metal coupling agent that exhibits such an effect, there is a metal coupling agent that includes an epoxy group and/or an amino group in its structure. Accordingly, the metal coupling agent may preferably include an epoxy group and/or an amino group.

The dispersant and the organic solvent are described above, so that the description is omitted here.

The ratios of the components included in the dispersion liquid according to the embodiment is not particularly limited, and they can be freely selected.

The dispersion liquid according to the embodiment may preferably include, for example, the dispersant with a ratio such that the dispersant is greater than or equal to 10 parts by mass and less than or equal to 1000 parts by mass with respect to the 100 parts by mass of the composite tungsten oxide particles, and the dispersion liquid according to the embodiment may be more preferably include the dispersant so that it is greater than or equal to 30 parts by mass and less than or equal to 400 parts by mass.

Further, the dispersion liquid according to the embodiment may preferably include the metal coupling agent, for example, with a ratio such that it is greater than or equal to 1 part by mass and less than or equal to 100 parts by mass relative to 100 parts by mass of the composite tungsten oxide particles, and may more preferably include the metal coupling agent so that it is greater than or equal to 5 parts by mass and less than or equal to 40 parts by mass.

Next, an example of the configuration of the method for manufacturing the dispersion liquid according to the embodiment is described.

The method for manufacturing the dispersion liquid according to the embodiment may include the following processes, for example.

The method for manufacturing the dispersion liquid according to the embodiment may include a process for manufacturing the dispersion liquid. In the process for manufacturing the dispersion liquid, the composite tungsten oxide particle, the metal coupling agent, and the dispersant are added to and mixed with the organic solvent. As the composite tungsten oxide particles, particles of a composite tungsten oxide represented by a general formula $M_xWO_y$, (where, M is one or more elements selected from Cs, Rb, K, Tl, In, Ba, Li, Ca, Sr, Fe, Sri, Al, Cu, and Na, $0.1 \leq x \leq 0.5$, and $2.2 \leq y \leq 3.0$) can be used.

Note that the process for manufacturing the dispersion liquid may include one process, or may include a plurality of processes.

For example, the dispersion liquid manufacturing process may include a first dispersion liquid manufacturing process and a second dispersion liquid manufacturing process, which are described below.

In the first dispersion liquid manufacturing process, a partial dispersion liquid may be manufactured in which the composite tungsten oxide particles and the dispersant are dispersed in the organic solvent.

In the second dispersion liquid manufacturing process, the metal coupling agent is further added to and mixed with the partial dispersion liquid manufactured by the first dispersion liquid manufacturing process, and thereby the dispersion liquid can be manufactured.

Note that it is not necessary to add all of the dispersant at once. When the dispersant is to be added in a plurality of divided steps, for example, a part of the total addition amount of the dispersant to be added may be added in the first dispersion liquid manufacturing process, and a dispersant addition process may further be provided separately that is for adding and mixing the dispersant. Namely, the dispersion liquid manufacturing process may include, for example, the first dispersion liquid manufacturing process, the dispersant addition process, and the second dispersion liquid manufacturing process.

In this case, a partial dispersion liquid in which the composite tungsten oxide particles and a part of the total addition amount of the dispersant are dispersed in the organic solvent may be manufactured by the first dispersion liquid manufacturing process.

In the dispersant addition process, the remaining dispersant can be added to and mixed with the partial dispersion liquid formed by the first dispersion liquid manufacturing process.

In the second dispersion liquid manufacturing process, the metal coupling agent can further be added to and mixed with the partial dispersion liquid to which the dispersant is added in the dispersion liquid manufacturing process, and thereby the dispersion liquid can be manufactured.

As for the metal coupling agent, it is not necessary to add only by the second dispersion liquid manufacturing process. For example, considering the viscosity of the dispersion liquid, first, in the first dispersion liquid manufacturing process, a partial dispersion liquid is formed by applying a known dispersion method to a mixture of a part of the total addition amount of the metal coupling agent, the composite tungsten oxide particles, the dispersant, and the organic solvent.

Then, in the second dispersion liquid manufacturing process, the remaining metal coupling agent may further be added and mixed to manufacture the dispersion liquid. In this case, the dispersant may be added in a plurality of divided steps. For example, in the first dispersion liquid manufacturing process, a part of the total addition amount of the dispersant may be added, and a dispersant addition process may further be provided, which is for adding the dispersant to the obtained partial dispersion liquid to mix them.

EXAMPLES

In the following, the present invention is more specifically described while referring to the examples. However, the present invention is not limited to the following examples.

First, a method of evaluating samples in the following examples and reference examples is described.

(Volume Average Particle Size)

The volume average particle size of the composite tungsten oxide particles in the particle dispersion liquid was measured by Microtrac particle size distribution meter (Model: UPS-UT, manufactured by Nikkiso Co., Ltd.).

(Total Light Transmittance)

The total light transmittance of the obtained heat-ray shielding film was measured based on JIS K 7361-1 using Haze & Transmittance meter (Model: HM-150, manufactured by Murakami Color Research Laboratory Co., Ltd.).

Note that the total light transmittance was measured prior to the whether resistance test and after the test.

(Visible Light Transmittance, Solar Radiation Transmittance, and Ultraviolet Irradiation Test)

The visible light transmittance and the solar radiation transmittance of the heat-ray shielding laminated transparent substrate were calculated based on JIS R 3106 from the transmittance for 200 nm through 2600 nm measured using a spectrophotometer (Model: U-4100, manufactured by Hitachi, Ltd.).

The light resistance of the heat-ray shielding transparent substrate was confirmed by measuring the total light transmittance of the heat-ray shielding laminated transparent substrate prior to and after the ultraviolet irradiation test and taking the difference. Namely, it can be determined that the light resistance is favorable if the difference between the total light transmittance prior to and after the ultraviolet irradiation test is small. Specifically, it can be said that it has sufficient light resistance if the absolute value of the difference between the total light transmittance of the heat-ray shielding laminated transparent substrate prior to and after the ultraviolet irradiation test is less than or equal to 9%.

Note that the evaluation of the light resistance was performed after forming the heat-ray shielding laminated transparent substrate as described above. Here, the heat-ray shielding laminated transparent substrate was obtained by disposing the heat-ray shielding film between a pair of the transparent substrates and by securing them. Accordingly, when it is determined, as a result of the evaluation of the light resistance, that it has sufficient light resistance, the heat-ray shielding film included in the heat-ray shielding laminated transparent substrate is also provided with the sufficient light resistance. Namely, for such a heat-ray shielding film, occurrence of the light coloring phenomenon can be suppressed.

The ultraviolet irradiation test was performed by using a super accelerated testing machine (Model: SUV-W131, manufactured by Iwasaki Electric Co., Ltd.) to irradiate ultraviolet rays (intensity 100 mW/cm$^2$), for which a metal halide lamp was used as a light source, for 16 hours under an environment with a temperature of 60° C. and a relative humidity of 35%.

In the following, manufacturing conditions and evaluation results of the samples according to the examples and the reference examples are described.

Example 1

As the composite tungsten oxide particles, 20 parts by mass $Cs_{0.33}WO_3$ particles (which is denoted as the particles "a," hereinafter), 10 parts by mass dispersant provided with a group including an amine as a functional group and an acrylic main chain (amine value 48 mg KOH/g, decomposition temperature 250° C.) (which is denoted as the dispersant "a," hereinafter), and, as the organic solvent, 70 parts by mass methyl isobutyl ketone (boiling point 116.2° C.) were prepared. These raw materials were loaded into a paint shaker, in which $ZrO_2$ beads with a diameter of 0.3 mm were loaded, and a dispersion liquid of the particles "a" (which is denoted as the particle dispersion liquid "a," hereinafter) was obtained by applying the crushing and dispersing process for 7 hours (the first dispersion liquid manufacturing process).

Note that it was confirmed that the particles "a" include $Cs_{0.33}WO_3$ with hexagonal crystals, by performing powder X-ray diffraction measurement for the particles "a" in advance.

Here, the volume average particle size of the composite tungsten oxide particles in the particle dispersion liquid "a" was measured by the above-described method, and it was founded to be 24 nm. Note that, in the subsequent steps, as the operation to change the volume average particle size of the composite tungsten oxide particles, such as the crushing process, was not performed, the above-described volume average particle size was the volume average particle size of the composite tungsten oxide particles in the heat-ray shielding film.

Subsequently, the dispersant "a" was added to the particle dispersion liquid "a" so that the mass ratio of the dispersant with respect to the composite tungsten oxide in the dispersion liquid was [composite tungsten oxide]/[dispersant] =100/200, and then these were sufficiently mixed (the dispersant addition process). Note that the mass of the dispersant in the above-described formula represents the sum of the amount added during manufacturing the particle dispersion liquid "a," namely, during the first dispersion liquid manufacturing process, and the amount added during the dispersant addition process after manufacturing the particle dispersion liquid "a."

To the particle dispersion liquid "a" to which the dispersant is added and mixed, 3-aminopropyltrimethoxysilane (CAS No. 13822-56-5, which is also denoted as the silane coupling agent "a," hereinafter), which was the metal coupling agent, was further added and they were mixed, so that the mass ratio of the metal coupling agent with respect to the composite tungsten oxide in the dispersion liquid was [composite tungsten oxide]/[metal coupling agent]=100/10 (the second dispersion liquid manufacturing process). By the second dispersion liquid manufacturing process, a dispersion liquid (which is denoted as the particle dispersion liquid "a'," hereinafter) including the composite tungsten oxide particles, the dispersant, the metal coupling agent, and the organic solvent was obtained.

Next, the particle dispersion liquid "a'" was loaded into a stirring vacuum dryer.

Then, the methyl isobutyl ketone was removed by performing vacuum drying at a normal temperature using the stirring vacuum dryer, and thereby a dispersoid (which is denoted as the dispersoid "a," hereinafter) was obtained that included the particles "a," the dispersant, the metal coupling agent, and a very small amount of residual organic solvent. The content of methyl isobutyl ketone as the organic solvent in the obtained dispersoid "a" was 3.4% by mass (the dispersoid manufacturing process).

Then, 97.8 parts by mass Himilan 1706 (manufactured by Mitsui-Dupont Polychemicals Co., Ltd., which is also denoted as ethylene-based ionomer 1, hereinafter), which was a pellet of an ionomer resin, 1.6 parts by mass dispersant "a," and 0.6 parts by mass of Tinuvin (registered trademark) 326 (manufactured by BASF AG), which was an ultraviolet absorbing agent, were prepared, and a mixed composition was manufactured by sufficiently mixing them. Note that Himilan 1706 is an ethylene-based ionomer and included zinc as a metal ion. Further, Tinuvin 326, which is the ultraviolet absorbing agent, is a benzotriazole compound represented by the above-described chemical formula 1.

The mixed composition of the obtained ionomer resin pellet and the dispersoid "a" was fed to a twin screw extruder set at 220° C. and mixed (mixing process), and then they were formed into a sheet with a thickness of 0.5 mm by an extrusion calender roll method from a T-die (molding process). As a result, the heat-ray shielding film (which is denoted as the heat-ray shielding film A, hereinafter) was obtained. Note that the content of the composite tungsten oxide particles in the heat-ray shielding film A per unit area in the projected area of the manufactured heat-ray shielding film A was 1.3 g/m$^2$. Furthermore, the metal coupling agent was included in the film at a rate of 0.05% by mass, and the ultraviolet absorbing agent was included in the film at a rate of 0.6% by mass.

Then the heat-ray shielding laminated transparent substrate (which is denoted as the heat-ray shielding laminated transparent substrate A, hereinafter) was obtained by temporarily clamping the manufactured heat-ray shielding film A between two transparent float glasses (each with the thickness of 3 mm), and by pressing them for five minutes under vacuum after heating them to 130° C.

When the visible light transmittance and the solar shielding coefficient were measured and calculated for the heat-ray shielding laminated transparent substrate A by the above-described method, the visible light transmittance was 70.5% and the solar radiation transmittance was 32.7%.

Furthermore, the ultraviolet irradiation test was performed for the heat-ray shielding laminated transparent substrate A. The total light transmittance prior to the test was 70.7%, and the total light transmittance after the test was 63.9%. Accordingly, the change in the total light transmittance between prior to the test and after the test was—6.8%.

The result is shown in Table 1.

the mass ratio of the metal coupling agent with respect to the composite tungsten oxide in the dispersion liquid was [composite tungsten oxide]/[metal coupling agent]=100/20 (the second dispersion liquid manufacturing process). By the second dispersion liquid manufacturing process, a dispersion liquid (which is denoted as the particle dispersion liquid "b'," hereinafter) including the composite tungsten oxide

TABLE 1

| | Heat-ray shielding film | | | | | | Evaluation result of the heat-ray shielding laminated transparent substrate | | | | |
|---|---|---|---|---|---|---|---|---|---|---|---|
| | | | | | | | Initial property | | Light resistance | | |
| | | | Metal coupling agent | | Ultraviolet absorbing agent | | Visible light | Solar radiation | | | [Prior to the test] − |
| | Composite tungsten oxide | Type of resin | Type | Addition amount (%) | Type | Addition amount (%) | transmittance (%) | transmittance (%) | Prior to the test (%) | After the test (%) | [After the test] (%) |
| Example 1 | $Cs_{0.33}WO_3$ | ethylene-based ionomer 1 | silane coupling agent a | 0.05 | (Chemical Formula 1) | 0.6 | 70.5 | 32.7 | 70.7 | 63.9 | −6.8 |
| Example 2 | $Cs_{0.33}WO_3$ | ethylene-based ionomer 1 | silane coupling agent a | 0.10 | (Chemical Formula 1) | 0.6 | 70.2 | 32.5 | 70.4 | 65.0 | −5.4 |
| Example 3 | $Cs_{0.33}WO_3$ | ethylene-based ionomer 1 | silane coupling agent b | 0.05 | (Chemical Formula 1) | 0.6 | 70.3 | 32.5 | 70.5 | 63.6 | −6.9 |
| Example 4 | $Cs_{0.33}WO_3$ | ethylene-based ionomer 1 | silane coupling agent c | 0.05 | (Chemical Formula 1) | 0.6 | 70.2 | 32.4 | 70.5 | 64.0 | −6.5 |
| Example 5 | $Cs_{0.33}WO_3$ | ethylene-based ionomer 1 | silane coupling agent d | 0.04 | (Chemical Formula 1) | 0.6 | 70.7 | 33.0 | 70.9 | 64.9 | −6.0 |
| Example 6 | $Cs_{0.33}WO_3$ | ethylene-based ionomer 1 | silane coupling agent e | 0.05 | (Chemical Formula 1) | 0.6 | 70.0 | 32.3 | 70.1 | 63.4 | −6.7 |
| Example 7 | $Cs_{0.33}WO_3$ | ethylene-based ionomer 1 | aluminate coupling agent | 0.05 | (Chemical Formula 1) | 0.6 | 70.3 | 32.7 | 70.5 | 63.4 | −7.1 |
| Example 8 | $Cs_{0.33}WO_3$ | ethylene-based ionomer 1 | titanate coupling agent | 0.05 | (Chemical Formula 1) | 0.6 | 70.1 | 32.4 | 70.3 | 63.7 | −6.6 |
| Example 9 | $Cs_{0.33}WO_3$ | ethylene-based ionomer 1 | silane coupling agent a | 0.05 | (Chemical Formula 1) | 1.0 | 70.3 | 32.1 | 70.5 | 66.8 | −3.7 |
| Example 10 | $Cs_{0.33}WO_3$ | ethylene-based ionomer 1 | silane coupling agent a | 0.05 | (Chemical Formula 1) | 3.0 | 70.1 | 31.5 | 70.2 | 68.7 | −1.5 |
| Example 11 | $Cs_{0.33}WO_3$ | ethylene-based ionomer 1 | silane coupling agent a | 0.05 | (Chemical Formula 2) | 1.0 | 70.3 | 32.7 | 70.3 | 64.5 | −5.8 |
| Example 12 | $Cs_{0.33}WO_3$ | ethylene-based ionomer 2 | silane coupling agent a | 0.05 | (Chemical Formula 1) | 0.6 | 70.2 | 32.8 | 70.4 | 63.7 | −6.7 |
| Example 13 | $Cs_{0.33}WO_3$ | polyvinyl butyral | silane coupling agent a | 0.05 | (Chemical Formula 1) | 0.6 | 70.1 | 32.5 | 70.4 | 64.4 | −6.0 |
| Example 14 | $Cs_{0.33}WO_3$ | ethylene-vinyl acetate copolymer | silane coupling agent c | 0.05 | (Chemical Formula 1) | 0.6 | 70.0 | 32.1 | 70.2 | 63.1 | −7.1 |
| Reference example 1 | $Cs_{0.33}WO_3$ | ethylene-based ionomer 1 | — | — | — | — | 70.1 | 33.0 | 70.2 | 31.9 | −38.3 |
| Reference example 2 | $Cs_{0.33}WO_3$ | ethylene-based ionomer 1 | — | — | (Chemical Formula 1) | 0.6 | 70.6 | 32.7 | 70.8 | 61.2 | −9.6 |

Example 2

After adding the dispersant "a" to the particle dispersion liquid "a" manufactured in Example 1 so that the mass ratio of the dispersant to the composite tungsten oxide in the dispersion liquid is [composite tungsten oxide]/[dispersant]=100/200, they were sufficiently mixed (the dispersant addition process). Note that the mass of the dispersant in the above-described formula represents the sum of the amount added during manufacturing the particle dispersion liquid "a," namely, during the first dispersion liquid manufacturing process, and the amount added during the dispersant addition process after manufacturing the particle dispersion liquid "a."

To the particle dispersion liquid "a" to which the dispersant is added and mixed, 3-aminopropyltrimethoxysilane (the silane coupling agent "a"), which was the metal coupling agent, was further added and they were mixed, so that particles, the dispersant, the metal coupling agent, and the organic solvent was obtained.

Next, the particle dispersion liquid "b'" was loaded into the stirring vacuum dryer.

Then, the methyl isobutyl ketone was removed by performing vacuum drying at a normal temperature using the stirring vacuum dryer, and thereby a dispersoid (which is denoted as the dispersoid "b," hereinafter) was obtained that included the particles "a," the dispersant, the metal coupling agent, and a very small amount of residual organic solvent. The content of methyl isobutyl ketone as the organic solvent in the obtained dispersoid "b" was 2.5% by mass.

Similar to Example 1, except that the dispersoid "b" was used as a substitute for the dispersoid "a," namely, after forming a mixed composition by mixing with the ethylene-based ionomer 1, etc., the heat-ray shielding film (which is denoted as the heat-ray shielding film B, hereinafter) was obtained by performing the mixing process and the molding process.

Note that, similar to above, the composition of the mixed composition is the same as that of Example 1, except that the dispersoid "b" was used instead of the dispersoid "a."

The content of the composite tungsten oxide particles in the heat-ray shielding film B per unit area in the projected area of the manufactured heat-ray shielding film B was 1.3 g/m$^2$. Furthermore, the addition amount of the metal coupling agent in the film was 0.10% by mass, and the addition amount of the ultraviolet absorbing agent in the film was 0.6% by mass.

Then the heat-ray shielding laminated transparent substrate (which is denoted as the heat-ray shielding laminated transparent substrate B, hereinafter) was obtained by temporarily clamping the manufactured heat-ray shielding film B between two transparent float glasses (each with the thickness of 3 mm), and by pressing them for five minutes under vacuum after heating them to 130° C.

When the visible light transmittance and the solar shielding coefficient were measured and calculated for the heat-ray shielding laminated transparent substrate B by the above-described method, the visible light transmittance was 70.2% and the solar radiation transmittance was 32.5%.

Furthermore, the ultraviolet irradiation test was performed for the heat-ray shielding laminated transparent substrate B. The total light transmittance prior to the test was 70.4%, and the total light transmittance after the test was 65.0%. Accordingly, the change in the total light transmittance between prior to the test and after the test was—5.4%.

The result is shown in Table 1.

Example 3

After adding the dispersant "a" to the particle dispersion liquid "a" manufactured in Example 1 so that the mass ratio of the dispersant to the composite tungsten oxide in the dispersion liquid is [composite tungsten oxide]/[dispersant]=100/200, they were sufficiently mixed (the dispersant addition process). Note that the mass of the dispersant in the above-described formula represents the sum of the amount added during manufacturing the particle dispersion liquid "a," namely, during the first dispersion liquid manufacturing process, and the amount added during the dispersant addition process after manufacturing the particle dispersion liquid "a."

To the particle dispersion liquid "a" to which the dispersant is added and mixed, 3-aminopropyltrimethoxysilane (CAS No. 919-30-2, which is also denoted as the silane coupling agent "b," hereinafter), which was the metal coupling agent, was further added and they were mixed, so that the mass ratio of the metal coupling agent with respect to the composite tungsten oxide in the dispersion liquid was [composite tungsten oxide]/[metal coupling agent]=100/10 (the second dispersion liquid manufacturing process). By the second dispersion liquid manufacturing process, a dispersion liquid (which is denoted as the particle dispersion liquid "c'," hereinafter) including the composite tungsten oxide particles, the dispersant, the metal coupling agent, and the organic solvent was obtained.

Next, the particle dispersion liquid "c'" was loaded into the stirring vacuum dryer.

Then, the methyl isobutyl ketone was removed by performing vacuum drying at a normal temperature using the stirring vacuum dryer, and thereby a dispersoid (which is denoted as the dispersoid "c," hereinafter) was obtained that included the particles "a," the dispersant, the metal coupling agent, and a very small amount of residual organic solvent.

The content of methyl isobutyl ketone as the organic solvent in the obtained dispersoid "c" was 2.1% by mass.

Similar to Example 1, except that the dispersoid "c" was used as a substitute for the dispersoid "a," namely, after forming a mixed composition by mixing with the ethylene-based ionomer 1, etc., the heat-ray shielding film (which is denoted as the heat-ray shielding film C, hereinafter) was obtained by performing the mixing process and the molding process.

Note that, similar to above, the composition of the mixed composition is the same as that of Example 1, except that the dispersoid "c" was used instead of the dispersoid "a."

The content of the composite tungsten oxide particles in the heat-ray shielding film C per unit area in the projected area of the manufactured heat-ray shielding film C was 1.3 g/m$^2$. Furthermore, the addition amount of the metal coupling agent in the film was 0.05% by mass, and the addition amount of the ultraviolet absorbing agent in the film was 0.6% by mass.

Then the heat-ray shielding laminated transparent substrate (which is denoted as the heat-ray shielding laminated transparent substrate C, hereinafter) was obtained by temporarily clamping the manufactured heat-ray shielding film C between two transparent float glasses (each with the thickness of 3 mm), and by pressing them for five minutes under vacuum after heating them to 130° C.

When the visible light transmittance and the solar shielding coefficient were measured and calculated for the heat-ray shielding laminated transparent substrate C by the above-described method, the visible light transmittance was 70.3% and the solar radiation transmittance was 32.5%.

Furthermore, the ultraviolet irradiation test was performed for the heat-ray shielding laminated transparent substrate C. The total light transmittance prior to the test was 70.5%, and the total light transmittance after the test was 63.6%. Accordingly, the change in the total light transmittance between prior to the test and after the test was—6.9%.

The result is shown in Table 1.

Example 4

After adding the dispersant "a" to the particle dispersion liquid "a" manufactured in Example 1 so that the mass ratio of the dispersant to the composite tungsten oxide in the dispersion liquid is [composite tungsten oxide]/[dispersant]=100/200, they were sufficiently mixed (the dispersant addition process). Note that the mass of the dispersant in the above-described formula represents the sum of the amount added during manufacturing the particle dispersion liquid "a," namely, during the first dispersion liquid manufacturing process, and the amount added during the dispersant addition process after manufacturing the particle dispersion liquid "a."

To the particle dispersion liquid "a" to which the dispersant is added and mixed, 3-(2-aminoethylamino) propyldimethoxymethylsilane (CAS No. 3069-29-2, which is also denoted as the silane coupling agent "c," hereinafter), which was the metal coupling agent, was further added and they were mixed, so that the mass ratio of the metal coupling agent with respect to the composite tungsten oxide in the dispersion liquid was [composite tungsten oxide]/[metal coupling agent]=100/10 (the second dispersion liquid manufacturing process). A dispersion liquid (which is denoted as the particle dispersion liquid "c'," hereinafter) including the composite tungsten oxide particles, the dispersant, the metal coupling agent, and the organic solvent was obtained.

Next, the particle dispersion liquid "d'" was loaded into the stirring vacuum dryer.

Then, the methyl isobutyl ketone was removed by performing vacuum drying at a normal temperature using the stirring vacuum dryer, and thereby a dispersoid (which is denoted as the dispersoid "d," hereinafter) was obtained that included the particles "a," the dispersant, the metal coupling agent, and a very small amount of residual organic solvent. The content of methyl isobutyl ketone as the organic solvent in the obtained dispersoid "d" was 3.5% by mass.

Similar to Example 1, except that the dispersoid "d" was used as a substitute for the dispersoid "a," namely, after forming a mixed composition by mixing with the ethylene-based ionomer 1, etc., the heat-ray shielding film (which is denoted as the heat-ray shielding film D, hereinafter) was obtained by performing the mixing process and the molding process.

Note that, similar to above, the composition of the mixed composition is the same as that of Example 1, except that the dispersoid "d" was used instead of the dispersoid "a."

The content of the composite tungsten oxide particles in the heat-ray shielding film D per unit area in the projected area of the manufactured heat-ray shielding film D was 1.3 g/m$^2$. Furthermore, the addition amount of the metal coupling agent in the film was 0.05% by mass, and the addition amount of the ultraviolet absorbing agent in the film was 0.6% by mass.

Then the heat-ray shielding laminated transparent substrate (which is denoted as the heat-ray shielding laminated transparent substrate D, hereinafter) was obtained by temporarily clamping the manufactured heat-ray shielding film D between two transparent float glasses (each with the thickness of 3 mm), and by pressing them for five minutes under vacuum after heating them to 130° C.

When the visible light transmittance and the solar shielding coefficient were measured and calculated for the heat-ray shielding laminated transparent substrate D by the above-described method, the visible light transmittance was 70.2% and the solar radiation transmittance was 32.4%.

Furthermore, the ultraviolet irradiation test was performed for the heat-ray shielding laminated transparent substrate D. The total light transmittance prior to the test was 70.5%, and the total light transmittance after the test was 64.0%. Accordingly, the change in the total light transmittance between prior to the test and after the test was—6.5%.

The result is shown in Table 1.

Example 5

After adding the dispersant "a" to the particle dispersion liquid "a" manufactured in Example 1 so that the mass ratio of the dispersant to the composite tungsten oxide in the dispersion liquid is [composite tungsten oxide]/[dispersant]=100/200, they were sufficiently mixed (the dispersant addition process). Note that the mass of the dispersant in the above-described formula represents the sum of the amount added during manufacturing the particle dispersion liquid "a," namely, during the first dispersion liquid manufacturing process, and the amount added during the dispersant addition process after manufacturing the particle dispersion liquid "a."

To the particle dispersion liquid "a" to which the dispersant is added and mixed, 3-(2-aminoethylamino) propyltrimethoxysilane (CAS No. 1760-24-3, which is also denoted as the silane coupling agent "d," hereinafter), which was the metal coupling agent, was further added and they were mixed, so that the mass ratio of the metal coupling agent with respect to the composite tungsten oxide in the dispersion liquid was [composite tungsten oxide]/[metal coupling agent]=100/8 (the second dispersion liquid manufacturing process). By the second dispersion liquid manufacturing process, a dispersion liquid (which is denoted as the particle dispersion liquid "e'," hereinafter) including the composite tungsten oxide particles, the dispersant, the metal coupling agent, and the organic solvent was obtained.

Next, the particle dispersion liquid "e'" was loaded into the stirring vacuum dryer.

Then, the methyl isobutyl ketone was removed by performing vacuum drying at a normal temperature using the stirring vacuum dryer, and thereby a dispersoid (which is denoted as the dispersoid "e," hereinafter) was obtained that included the particles "a," the dispersant, the metal coupling agent, and a very small amount of residual organic solvent. The content of methyl isobutyl ketone as the organic solvent in the obtained dispersoid "e" was 3.5% by mass.

Similar to Example 1, except that the dispersoid "e" was used as a substitute for the dispersoid "a," namely, after forming a mixed composition by mixing with the ethylene-based ionomer 1, etc., the heat-ray shielding film (which is denoted as the heat-ray shielding film E, hereinafter) was obtained by performing the mixing process and the molding process.

Note that, similar to above, the composition of the mixed composition is the same as that of Example 1, except that the dispersoid "e" was used instead of the dispersoid "a."

The content of the composite tungsten oxide particles in the heat-ray shielding film E per unit area in the projected area of the manufactured heat-ray shielding film E was 1.3 g/m$^2$. Furthermore, the addition amount of the metal coupling agent in the film was 0.04% by mass, and the addition amount of the ultraviolet absorbing agent in the film was 0.6% by mass.

Then the heat-ray shielding laminated transparent substrate (which is denoted as the heat-ray shielding laminated transparent substrate E, hereinafter) was obtained by temporarily clamping the manufactured heat-ray shielding film E between two transparent float glasses (each with the thickness of 3 mm), and by pressing them for five minutes under vacuum after heating them to 130° C.

When the visible light transmittance and the solar shielding coefficient were measured and calculated for the heat-ray shielding laminated transparent substrate E by the above-described method, the visible light transmittance was 70.7% and the solar radiation transmittance was 33.0%.

Furthermore, the ultraviolet irradiation test was performed for the heat-ray shielding laminated transparent substrate E. The total light transmittance prior to the test was 70.9%, and the total light transmittance after the test was 64.9%. Accordingly, the change in the total light transmittance between prior to the test and after the test was—6.0%.

The result is shown in Table 1.

Example 6

After adding the dispersant "a" to the particle dispersion liquid "a" manufactured in Example 1 so that the mass ratio of the dispersant to the composite tungsten oxide in the dispersion liquid is [composite tungsten oxide]/[dispersant]=100/200, they were sufficiently mixed (the dispersant addition process). Note that the mass of the dispersant in the above-described formula represents the sum of the amount added during manufacturing the particle dispersion liquid "a," namely, during the first dispersion liquid manufacturing process, and the amount added during the dispersant addition process after manufacturing the particle dispersion liquid "a."

To the particle dispersion liquid "a" to which the dispersant is added and mixed, trimethoxy [3-(phenylamino) propyl] silane (CAS No. 3068-76-6, which is also denoted as the silane coupling agent "e," hereinafter), which was the metal coupling agent, was further added and they were mixed, so that the mass ratio of the metal coupling agent with respect to the composite tungsten oxide in the dispersion liquid was [composite tungsten oxide]/[metal coupling agent]=100/10 (the second dispersion liquid manufacturing process). By the second dispersion liquid manufacturing process, a dispersion liquid (which is denoted as the particle dispersion liquid "f," hereinafter) including the composite tungsten oxide particles, the dispersant, the metal coupling agent, and the organic solvent was obtained.

Next, the particle dispersion liquid "f" was loaded into the stirring vacuum dryer.

Then, the methyl isobutyl ketone was removed by performing vacuum drying at a normal temperature using the stirring vacuum dryer, and thereby a dispersoid (which is denoted as the dispersoid "f," hereinafter) was obtained that included the particles "a," the dispersant, the metal coupling agent, and a very small amount of residual organic solvent. The content of methyl isobutyl ketone as the organic solvent in the obtained dispersoid "f" was 3.5% by mass.

Similar to Example 1, except that the dispersoid "f" was used as a substitute for the dispersoid "a," namely, after forming a mixed composition by mixing with the ethylene-based ionomer 1, etc., the heat-ray shielding film (which is denoted as the heat-ray shielding film F, hereinafter) was obtained by performing the mixing process and the molding process.

Note that, similar to above, the composition of the mixed composition is the same as that of Example 1, except that the dispersoid "f" was used instead of the dispersoid "a."

The content of the composite tungsten oxide particles in the heat-ray shielding film F per unit area in the projected area of the manufactured heat-ray shielding film F was 1.3 g/m². Furthermore, the addition amount of the metal coupling agent in the film was 0.05% by mass, and the addition amount of the ultraviolet absorbing agent in the film was 0.6% by mass.

Then the heat-ray shielding laminated transparent substrate (which is denoted as the heat-ray shielding laminated transparent substrate F, hereinafter) was obtained by temporarily clamping the manufactured heat-ray shielding film F between two transparent float glasses (each with the thickness of 3 mm), and by pressing them for five minutes under vacuum after heating them to 130° C.

When the visible light transmittance and the solar shielding coefficient were measured and calculated for the heat-ray shielding laminated transparent substrate F by the above-described method, the visible light transmittance was 70.0% and the solar radiation transmittance was 32.3%. Furthermore, the ultraviolet irradiation test was performed for the heat-ray shielding laminated transparent substrate F. The total light transmittance prior to the test was 70.1%, and the total light transmittance after the test was 63.4%. Accordingly, the change in the total light transmittance between prior to the test and after the test was—6.7%.

The result is shown in Table 1.

Example 7

After adding the dispersant "a" to the particle dispersion liquid "a" manufactured in Example 1 so that the mass ratio of the dispersant to the composite tungsten oxide in the dispersion liquid is [composite tungsten oxide]/[dispersant]=100/200, they were sufficiently mixed (the dispersant addition process). Note that the mass of the dispersant in the above-described formula represents the sum of the amount added during manufacturing the particle dispersion liquid "a," namely, during the first dispersion liquid manufacturing process, and the amount added during the dispersant addition process after manufacturing the particle dispersion liquid "a."

To the particle dispersion liquid "a" to which the dispersant is added and mixed, aluminum alkyl acetoacetate diisopropylate (CAS No. 80481-35-2), which was the metal coupling agent, was further added and they were mixed, so that the mass ratio of the metal coupling agent with respect to the composite tungsten oxide in the dispersion liquid was [composite tungsten oxide]/[metal coupling agent]=100/10 (the second dispersion liquid manufacturing process). By the second dispersion liquid manufacturing process, a dispersion liquid (which is denoted as the particle dispersion liquid "g'," hereinafter) including the composite tungsten oxide particles, the dispersant, the metal coupling agent, and the organic solvent was obtained.

Next, the particle dispersion liquid "f" was loaded into the stirring vacuum dryer.

Then, the methyl isobutyl ketone was removed by performing vacuum drying at a normal temperature using the stirring vacuum dryer, and thereby a dispersoid (which is denoted as the dispersoid "g," hereinafter) was obtained that included the particles "a," the dispersant, the metal coupling agent, and a very small amount of residual organic solvent. The content of methyl isobutyl ketone as the organic solvent in the obtained dispersoid "g" was 2.9% by mass.

Similar to Example 1, except that the dispersoid "g" was used as a substitute for the dispersoid "a," namely, after forming a mixed composition by mixing with the ethylene-based ionomer 1, etc., the heat-ray shielding film (which is denoted as the heat-ray shielding film G, hereinafter) was obtained by performing the mixing process and the molding process.

Note that, similar to above, the composition of the mixed composition is the same as that of Example 1, except that the dispersoid "g" was used instead of the dispersoid "a."

The content of the composite tungsten oxide particles in the heat-ray shielding film G per unit area in the projected area of the manufactured heat-ray shielding film G was 1.3 g/m². Furthermore, the addition amount of the metal coupling agent in the film was 0.05% by mass, and the addition amount of the ultraviolet absorbing agent in the film was 0.6% by mass.

Then the heat-ray shielding laminated transparent substrate (which is denoted as the heat-ray shielding laminated transparent substrate G, hereinafter) was obtained by temporarily clamping the manufactured heat-ray shielding film G between two transparent float glasses (each with the thickness of 3 mm), and by pressing them for five minutes under vacuum after heating them to 130° C.

When the visible light transmittance and the solar shielding coefficient were measured and calculated for the heat-ray shielding laminated transparent substrate G by the above-described method, the visible light transmittance was 70.3% and the solar radiation transmittance was 32.7%. Furthermore, the ultraviolet irradiation test was performed for the heat-ray shielding laminated transparent substrate G. The total light transmittance prior to the test was 70.5%, and the total light transmittance after the test was 63.4%. Accordingly, the change in the total light transmittance between prior to the test and after the test was—7.1%.

The result is shown in Table 1.

Example 8

After adding the dispersant "a" to the particle dispersion liquid "a" manufactured in Example 1 so that the mass ratio of the dispersant to the composite tungsten oxide in the dispersion liquid is [composite tungsten oxide]/[dispersant]=100/200, they were sufficiently mixed (the dispersant addition process). Note that the mass of the dispersant in the above-described formula represents the sum of the amount added during manufacturing the particle dispersion liquid "a," namely, during the first dispersion liquid manufacturing process, and the amount added during the dispersant addition process after manufacturing the particle dispersion liquid "a."

To the particle dispersion liquid "a" to which the dispersant is added and mixed, titanium triisostearoyl monoisopropoxide (CAS No. 61417-49-0), which was the metal coupling agent, was further added and they were mixed, so that the mass ratio of the metal coupling agent with respect to the composite tungsten oxide in the dispersion liquid was [composite tungsten oxide]/[metal coupling agent]=100/10 (the second dispersion liquid manufacturing process). By the second dispersion liquid manufacturing process, a dispersion liquid (which is denoted as the particle dispersion liquid "h'," hereinafter) including the composite tungsten oxide particles, the dispersant, the metal coupling agent, and the organic solvent was obtained.

Next, the particle dispersion liquid "h'" was loaded into the stirring vacuum dryer.

Then, the methyl isobutyl ketone was removed by performing vacuum drying at a normal temperature using the stirring vacuum dryer, and thereby a dispersoid (which is denoted as the dispersoid "h," hereinafter) was obtained that included the particles "a," the dispersant, the metal coupling agent, and a very small amount of residual organic solvent. The content of methyl isobutyl ketone as the organic solvent in the obtained dispersoid "g" was 3.2% by mass.

Similar to Example 1, except that the dispersoid "h" was used as a substitute for the dispersoid "a," namely, after forming a mixed composition by mixing with the ethylene-based ionomer 1, etc., the heat-ray shielding film (which is denoted as the heat-ray shielding film H, hereinafter) was obtained by performing the mixing process and the molding process.

Note that, similar to above, the composition of the mixed composition is the same as that of Example 1, except that the dispersoid "h" was used instead of the dispersoid "a."

The content of the composite tungsten oxide particles in the heat-ray shielding film H per unit area in the projected area of the manufactured heat-ray shielding film H was 1.3 g/m². Furthermore, the addition amount of the metal coupling agent in the film was 0.05% by mass, and the addition amount of the ultraviolet absorbing agent in the film was 0.6% by mass.

Then the heat-ray shielding laminated transparent substrate (which is denoted as the heat-ray shielding laminated transparent substrate H, hereinafter) was obtained by temporarily clamping the manufactured heat-ray shielding film H between two transparent float glasses (each with the thickness of 3 mm), and by pressing them for five minutes under vacuum after heating them to 130° C.

When the visible light transmittance and the solar shielding coefficient were measured and calculated for the heat-ray shielding laminated transparent substrate H by the above-described method, the visible light transmittance was 70.1% and the solar radiation transmittance was 32.4%. Furthermore, the ultraviolet irradiation test was performed for the heat-ray shielding laminated transparent substrate H. The total light transmittance prior to the test was 70.3%, and the total light transmittance after the test was 63.7%. Accordingly, the change in the total light transmittance between prior to the test and after the test was—6.6%.

The result is shown in Table 1.

Example 9

The heat-ray shielding film was manufactured similar to Example 1, except that the composition of the materials supplied to the mixing process was changed.

Specifically, 97.4 parts by mass Himilan 1707, which is a pellet of an ionomer resin, 1.6 parts by mass dispersant "a," and 1.0 part by mass Tinuvin 326, which is an ultraviolet absorbing agent, were prepared, and a mixed composition was manufactured by sufficiently mixing them.

As the method for preparing the dispersant "a" is described in Example 1, the description is omitted.

The obtained mixed composition was fed to a twin screw extruder set at 210° C. and mixed (mixing process), and then the mixed composition was formed into a sheet with a thickness of 0.5 mm by a calender roll method from a T-die (molding process). As a result, the heat-ray shielding film (which is denoted as the heat-ray shielding film I, hereinafter) was obtained.

Note that the content of the composite tungsten oxide particles in the heat-ray shielding film I per unit area in the projected area of the manufactured heat-ray shielding film I was 1.3 g/m². Furthermore, the addition amount of the metal coupling agent in the film was 0.05% by mass, and the addition amount of the ultraviolet absorbing agent in the film was 1.0% by mass.

Then the heat-ray shielding laminated transparent substrate (which is denoted as the heat-ray shielding laminated transparent substrate I, hereinafter) was obtained by temporarily clamping the manufactured heat-ray shielding film I between two transparent float glasses (each with the thickness of 3 mm), and by pressing them for five minutes under vacuum after heating them to 130° C.

When the visible light transmittance and the solar shielding coefficient were measured and calculated for the heat-ray shielding laminated transparent substrate I by the above-described method, the visible light transmittance was 70.3% and the solar radiation transmittance was 32.1%.

Furthermore, the ultraviolet irradiation test was performed for the heat-ray shielding laminated transparent substrate I. The total light transmittance prior to the test was 70.5%, and the total light transmittance after the test was 66.6%. Accordingly, the change in the total light transmittance between prior to the test and after the test was—3.7%.

The result is shown in Table 1.

Example 10

The heat-ray shielding film was manufactured similar to Example 1, except that the composition of the materials supplied to the mixing process was changed.

Specifically, 95.4 parts by mass Himilan 1707, which is a pellet of an ionomer resin, 1.6 parts by mass dispersoid "a," and 3.0 parts by mass Tinuvin 326, which is an ultraviolet absorbing agent, were prepared, and a mixed composition was manufactured by sufficiently mixing them.

As the method for preparing the dispersoid "a" is described in Example 1, the description is omitted.

The obtained mixed composition was fed to a twin screw extruder set at 210° C. and mixed (mixing process), and then the mixed composition was formed into a sheet with a thickness of 0.5 mm by a calender roll method from a T-die (molding process). As a result, the heat-ray shielding film (which is denoted as the heat-ray shielding film J, hereinafter) was obtained.

Note that the content of the composite tungsten oxide particles in the heat-ray shielding film J per unit area in the projected area of the manufactured heat-ray shielding film J was 1.3 g/m$^2$. Furthermore, the addition amount of the metal coupling agent in the film was 0.05% by mass, and the addition amount of the ultraviolet absorbing agent in the film was 3.0% by mass.

Then the heat-ray shielding laminated transparent substrate (which is denoted as the heat-ray shielding laminated transparent substrate J, hereinafter) was obtained by temporarily clamping the manufactured heat-ray shielding film J between two transparent float glasses (each with the thickness of 3 mm), and by pressing them for five minutes under vacuum after heating them to 130° C.

When the visible light transmittance and the solar shielding coefficient were measured and calculated for the heat-ray shielding laminated transparent substrate J by the above-described method, the visible light transmittance was 70.1% and the solar radiation transmittance was 31.5%.

Furthermore, the ultraviolet irradiation test was performed for the heat-ray shielding laminated transparent substrate J. The total light transmittance prior to the test was 70.2%, and the total light transmittance after the test was 68.7%. Accordingly, the change in the total light transmittance between prior to the test and after the test was—1.5%.

The result is shown in Table 1.

Example 11

The heat-ray shielding film was manufactured similar to Example 1, except that the composition of the materials supplied to the mixing process was changed.

Specifically, 97.4 parts by mass Himilan 1706, which is a pellet of an ionomer resin, 1.6 parts by mass dispersoid "a," and 1.0 part by mass Tinuvin 328 (manufactured by BASF AG), which is an ultraviolet absorbing agent, were prepared, and a mixed composition was manufactured by sufficiently mixing them.

Note that Tinuvin 328, which is the ultraviolet absorbing agent, is a benzotriazole compound represented by the chemical formula 2 described above. Further, as the method for preparing the dispersoid "a" is described in Example 1, the description is omitted.

The obtained mixed composition was fed to a twin screw extruder set at 210° C. and mixed (mixing process), and then the mixed composition was formed into a sheet with a thickness of 0.5 mm by a calender roll method from a T-die (molding process). As a result, the heat-ray shielding film (which is denoted as the heat-ray shielding film K, hereinafter) was obtained.

Note that the content of the composite tungsten oxide particles in the heat-ray shielding film K per unit area in the projected area of the manufactured heat-ray shielding film K was 1.3 g/m$^2$. Furthermore, the addition amount of the metal coupling agent in the film was 0.05% by mass, and the addition amount of the ultraviolet absorbing agent in the film was 1.0% by mass.

Then the heat-ray shielding laminated transparent substrate (which is denoted as the heat-ray shielding laminated transparent substrate K, hereinafter) was obtained by temporarily clamping the manufactured heat-ray shielding film K between two transparent float glasses (each with the thickness of 3 mm), and by pressing them for five minutes under vacuum after heating them to 130° C.

When the visible light transmittance and the solar shielding coefficient were measured and calculated for the heat-ray shielding laminated transparent substrate K by the above-described method, the visible light transmittance was 70.3% and the solar radiation transmittance was 32.7%.

Furthermore, the ultraviolet irradiation test was performed for the heat-ray shielding laminated transparent substrate K. The total light transmittance prior to the test was 70.3%, and the total light transmittance after the test was 64.5%. Accordingly, the change in the total light transmittance between prior to the test and after the test was—5.8%.

The result is shown in Table 1.

Example 12

The heat-ray shielding film (which is denoted as the heat-ray shielding film L, hereinafter) was obtained similar to Example 1, except that IOTEK IONOMERS 4220 (manufactured by EXXON MOBILE CHEMICAL, Ltd., which is denoted as ethylene-based ionomer 2 in Table 1) was used as a pellet of an ionomer resin, instead of Himilan 1706. Note that IOTEK IONOMERS 4220 is an ethylene-based ionomer and includes zinc as a metal ion.

Note that the content of the composite tungsten oxide particles in the heat-ray shielding film L per unit area in the projected area of the manufactured heat-ray shielding film L was 1.3 g/m$^2$. Furthermore, the addition amount of the metal coupling agent in the film was 0.05% by mass, and the addition amount of the ultraviolet absorbing agent in the film was 0.6% by mass.

Then the heat-ray shielding laminated transparent substrate (which is denoted as the heat-ray shielding laminated transparent substrate L, hereinafter) was obtained by temporarily clamping the manufactured heat-ray shielding film L between two transparent float glasses (each with the thickness of 3 mm), and by pressing them for five minutes under vacuum after heating them to 130° C.

When the visible light transmittance and the solar shielding coefficient were measured and calculated for the heat-ray shielding laminated transparent substrate L by the above-described method, the visible light transmittance was 70.2% and the solar radiation transmittance was 32.8%.

Furthermore, the ultraviolet irradiation test was performed for the heat-ray shielding laminated transparent substrate L. The total light transmittance prior to the test was 70.4%, and the total light transmittance after the test was 63.7%. Accordingly, the change in the total light transmittance between prior to the test and after the test was—6.7%.

The result is shown in Table 1.

Example 13

The heat-ray shielding film was manufactured similar to Example 1, except that a part of the materials supplied to the mixing process and the composition of the materials supplied to the mixing process were changed.

Specifically, a polyvinyl butyral resin was used instead of the ethylene-based ionomer 1 (Himilan 1706).

Then, 69.9 parts by mass polyvinyl butyral resin, 27.9 parts by mass triethylene glycol-di-2-ethylhexanonate, as a plasticizer, 1.6 parts by mass dispersoid "a," and 0.6 part by mass Tinuvin 326, as an ultraviolet absorbing agent, were prepared, and a mixed composition was manufactured by sufficiently mixing them.

As the method for preparing the dispersoid "a" is described in Example 1, the description is omitted.

The obtained mixed composition was fed to a twin screw extruder set at 210° C. and mixed (mixing process), and then the mixed composition was formed into a sheet with a thickness of 0.5 mm by a calender roll method from a T-die (molding process). As a result, the heat-ray shielding film (which is denoted as the heat-ray shielding film M, hereinafter) was obtained.

Note that the content of the composite tungsten oxide particles in the heat-ray shielding film M per unit area in the projected area of the manufactured heat-ray shielding film M was 1.3 Furthermore, the addition amount of the metal coupling agent in the film was 0.05% by mass, and the addition amount of the ultraviolet absorbing agent in the film was 0.6% by mass.

Then the heat-ray shielding laminated transparent substrate (which is denoted as the heat-ray shielding laminated transparent substrate M, hereinafter) was obtained by temporarily clamping the manufactured heat-ray shielding film M between two transparent float glasses (each with the thickness of 3 mm), and by pressing them for five minutes under vacuum after heating them to 130° C.

When the visible light transmittance and the solar shielding coefficient were measured and calculated for the heat-ray shielding laminated transparent substrate M by the above-described method, the visible light transmittance was 70.1% and the solar radiation transmittance was 32.5%.

Furthermore, the ultraviolet irradiation test was performed for the heat-ray shielding laminated transparent substrate M. The total light transmittance prior to the test was 70.4%, and the total light transmittance after the test was 64.4%. Accordingly, the change in the total light transmittance between prior to the test and after the test was—6.0%.

The result is shown in Table 1.

Example 14

The heat-ray shielding film was manufactured similar to Example 1, except that a part of the materials supplied to the mixing process and the composition of the materials supplied to the mixing process were changed.

Specifically, an ethylene-vinyl acetate copolymer resin was used instead of the ethylene-based ionomer 1 (Himilan 1706).

Specifically, 97.8.9 parts by mass ethylene-vinyl acetate copolymer resin pellets, 1.6 parts by mass dispersoid "a," and 0.6 part by mass Tinuvin 326, as an ultraviolet absorbing agent, were prepared, and a mixed composition was manufactured by sufficiently mixing them.

As the method for preparing the dispersoid "a" is described in Example 1, the description is omitted.

The obtained mixed composition was fed to a twin screw extruder set at 220° C. and mixed (mixing process), and then the mixed composition was formed into a sheet with a thickness of 0.5 mm by an extrusion calender roll method from a T-die (molding process). As a result, the heat-ray shielding film (which is denoted as the heat-ray shielding film N, hereinafter) was obtained.

Note that the content of the composite tungsten oxide particles in the heat-ray shielding film N per unit area in the projected area of the manufactured heat-ray shielding film N was 1.3 g/m². Furthermore, the addition amount of the metal coupling agent in the film was 0.05% by mass, and the addition amount of the ultraviolet absorbing agent in the film was 0.6% by mass.

Then the heat-ray shielding laminated transparent substrate (which is denoted as the heat-ray shielding laminated transparent substrate N, hereinafter) was obtained by temporarily clamping the manufactured heat-ray shielding film N between two transparent float glasses (each with the thickness of 3 mm), and by pressing them for five minutes under vacuum after heating them to 130° C.

When the visible light transmittance and the solar shielding coefficient were measured and calculated for the heat-ray shielding laminated transparent substrate N by the above-described method, the visible light transmittance was 70.0% and the solar radiation transmittance was 32.1%.

Furthermore, the ultraviolet irradiation test was performed for the heat-ray shielding laminated transparent substrate N. The total light transmittance prior to the test was 70.2%, and the total light transmittance after the test was 63.1%. Accordingly, the change in the total light transmittance between prior to the test and after the test was—7.1%.

The result is shown in Table 1.

Reference Example 1

After adding the dispersant "a" to the particle dispersion liquid "a" manufactured in Example 1 so that the mass ratio of the dispersant to the composite tungsten oxide in the dispersion liquid is [composite tungsten oxide]/[dispersant]=100/200, they were sufficiently mixed (the dispersant addition process). Note that the mass of the dispersant in the above-described formula represents the sum of the amount added during manufacturing the particle dispersion liquid "a," namely, during the first dispersion liquid manufacturing process, and the amount added during the dispersant addition process after manufacturing the particle dispersion liquid "a."

After adding the dispersant to the particle dispersion liquid "a" and mixing them without adding the metal coupling agent, they were loaded into the stirring vacuum dryer.

Then, the methyl isobutyl ketone was removed by performing vacuum drying at a normal temperature using the stirring vacuum dryer, and thereby a dispersoid (which is denoted as the dispersoid "α," hereinafter) was obtained that included the particles "a," the dispersant, and a very small amount of residual organic solvent. The content of methyl isobutyl ketone in the obtained dispersoid "α" was 2.8% by mass. Note that, as the metal coupling agent was not added to the dispersoid "α" during the manufacturing process, it did not include the metal coupling agent.

Then, 98.4 parts by mass Himilan 1706, which was a pellet of an ionomer resin, and 1.6 parts by mass dispersoid "α" were prepared, and a mixed composition was manufactured by sufficiently mixing them.

The obtained mixed composition of the ionomer resin pellet and the dispersoid "α" was fed to a twin screw extruder set at 220° C. and mixed, and then the mixed composition was formed into a sheet with a thickness of 0.5 mm by an extrusion calender roll method from a T-die. As a result, the heat-ray shielding film (which is denoted as the heat-ray shielding film a, hereinafter) was obtained.

Note that the content of the composite tungsten oxide particles in the heat-ray shielding film a per unit area in the projected area of the manufactured heat-ray shielding film α was 1.3 g/m². Note that neither ultraviolet absorbing agent nor metal coupling agent was added to the heat-ray shielding film α, so that the content of the metal coupling agent was 0.

Then the heat-ray shielding laminated transparent substrate (which is denoted as the heat-ray shielding laminated transparent substrate α, hereinafter) was obtained by temporarily clamping the manufactured heat-ray shielding film α between two transparent float glasses (each with the thickness of 3 mm), and by pressing them for five minutes under vacuum after heating them to 130° C.

When the visible light transmittance and the solar shielding coefficient were measured and calculated for the heat-ray shielding laminated transparent substrate a by the above-described method, the visible light transmittance was 70.1% and the solar radiation transmittance was 33.0%.

Furthermore, the ultraviolet irradiation test was performed for the heat-ray shielding laminated transparent substrate α. The total light transmittance prior to the test was 70.2%, and the total light transmittance after the test was 31.9%. Accordingly, the change in the total light transmittance between prior to the test and after the test was—38.3%.

The result is shown in Table 1.

Reference Example 2

The heat-ray shielding film was manufactured similar to Example 1, except that the materials supplied to the mixing process were changed.

Specifically, 97.8 parts by mass Himilan 1706, which was a pellet of an ionomer resin, 1.6 parts by mass dispersoid "α," and 0.6 parts by mass Tinuvin 326, which was an ultraviolet absorbing agent, were prepared, and a mixed composition was manufactured by sufficiently mixing them.

The obtained mixed composition of the ionomer resin pellet, the dispersoid "α," and the ultraviolet absorbing agent was fed to a twin screw extruder set at 220° C. and mixed, and then the mixed composition was formed into a sheet with a thickness of 0.5 mm by an extrusion calender roll method from a T-die. As a result, the heat-ray shielding film (which is denoted as the heat-ray shielding film β, hereinafter) was obtained. Note that the content of the composite tungsten oxide particles in the heat-ray shielding film β per unit area in the projected area of the manufactured heat-ray shielding film β was 1.3 g/m². Further, the addition amount of the metal coupling agent in the film was 0% by mass, and the addition amount of the ultraviolet absorbing agent in the film was 0.6% by mass.

Then the heat-ray shielding laminated transparent substrate (which is denoted as the heat-ray shielding laminated transparent substrate β, hereinafter) was obtained by temporarily clamping the manufactured heat-ray shielding film β between two transparent float glasses (each with the thickness of 3 mm), and by pressing them for five minutes under vacuum after heating them to 130° C.

When the visible light transmittance and the solar shielding coefficient were measured and calculated for the heat-ray shielding laminated transparent substrate β by the above-described method, the visible light transmittance was 70.6% and the solar radiation transmittance was 32.7%.

Furthermore, the ultraviolet irradiation test was performed for the heat-ray shielding laminated transparent substrate β. The total light transmittance prior to the test was 70.8%, and the total light transmittance after the test was 61.2%. Accordingly, the change in the total light transmittance between prior to the test and after the test was—9.6%.

The result is shown in Table 1.

According to the results of the examples and the reference examples shown above, it can be confirmed that any one of the following heat-ray shielding laminated transparent substrates has a favorable heat shielding property: the heat-ray shielding laminated transparent substrates A through N in which the heat-ray shielding films A through N of Examples 1 through Example 14 are used as the interlayers, respectively; and the heat-ray shielding laminated transparent substrates α and β in which the heat-ray shielding films α and β are used as the interlayers, respectively.

However, according to the results of the ultraviolet irradiation test for evaluating the light resistance, it can be confirmed that the change in the total light transmittance between prior to and after the light resistance test was very large for the heat-ray shielding laminated transparent substrate a of the reference example 1. In the heat-ray shielding laminated transparent substrate β of the reference example 2, the heat-ray shielding film β as the interlayer includes the composite tungsten oxide and the ultraviolet absorbing agent. Thus, the change in the total light transmittance was suppressed compared to the reference example 1; however, the difference was still large.

In contrast, it is confirmed that the width of the change in the total light transmittance between prior to and after the ultraviolet irradiation test became small for any one of the heat-ray shielding laminated transparent substrates A through N of the Examples 1 through N compared to the heat-ray shielding laminated transparent substrates α and β of the reference examples 1 and 2. It can be said that, when the heat-ray shielding film as the interlayer of the heat-ray shielding laminated transparent substrate includes the composite tungsten oxide and the metal coupling agent, the heat-ray shielding film can exhibit high light resistance.

The heat-ray shielding film, the heat-ray shielding laminated transparent substrate, the automobile, the building, the dispersoid, the mixed composition, the method for manufacturing the dispersoid, the dispersion liquid, and the method for producing the dispersion liquid are described above by the embodiments and the examples; however, the present invention is not limited to the embodiments and the examples. Various modifications and alterations can be made within the scope of the gist of the present invention described in the claims.

The present application is based on and claims the benefit of priority of Japanese Priority Application No. 2015-131429 filed on Jun. 30, 2015, the entire contents of Japanese Priority Application No. 2015-131429 are hereby incorporated herein by reference.

The invention claimed is:

1. A heat-ray shielding film comprising:
composite tungsten oxide particles;
a dispersant;
a thermoplastic resin; and
a silane coupling agent that is a metal coupling agent,
wherein the composite tungsten oxide particles are represented by a general formula $M_xWO_y$, where M is one or more elements selected from Cs, Rb, K, Tl, In, Ba, Li, Ca, Sr, Fe, Sn, Al, Cu, and Na, $0.1 \leq x \leq 0.5$, and $2.2 \leq y \leq 3.0$.

2. The heat-ray shielding film according to claim 1, wherein the metal coupling agent is a silane coupling agent.

3. The heat-ray shielding film according to claim 1, wherein the metal coupling agent includes an epoxy group and/or an amino group.

4. The heat-ray shielding film according to claim 1, wherein content of the metal coupling agent in the heat-ray shielding film is greater than or equal to 0.01% by mass and less than or equal to 0.50% by mass.

5. The heat-ray shielding film according to claim 1, wherein the thermoplastic resin is one or more selected from an ionomer resin, a polyvinyl acetal resin, and an ethylene-vinyl acetate copolymer resin.

6. The heat-ray shielding film according to claim 1, wherein the thermoplastic resin is an ionomer resin.

7. The heat-ray shielding film according to claim 5, wherein the ionomer resin is an ethylene-based ionomer.

8. The heat-ray shielding film according to claim 5, wherein the ionomer resin includes one or more metal ions selected from zinc, magnesium, lithium, potassium, and sodium.

9. The heat-ray shielding film according to claim 1, wherein, in the general formula $M_xWO_y$ representing the composite tungsten oxide, M is Cs and/or Rb.

10. The heat-ray shielding film according to claim 1, wherein the composite tungsten oxide is a hexagonal crystal.

11. The heat-ray shielding film according to claim 1, wherein a volume average particle size of the composite tungsten oxide particles is less than or equal to 100 nm.

12. The heat-ray shielding film according to claim 1, further comprising:
an ultraviolet absorbing agent.

13. The heat-ray shielding film according to claim 12, wherein the ultraviolet absorbing agent includes one or more selected from a benzotriazole compound and a benzophenone compound.

14. The heat-ray shielding film according to claim 12, wherein the ultraviolet absorbing agent includes a compound represented by chemical formula 1 and/or chemical formula 2:

(Chemical Formula 1)

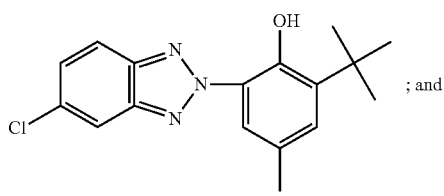

; and (Chemical Formula 2)

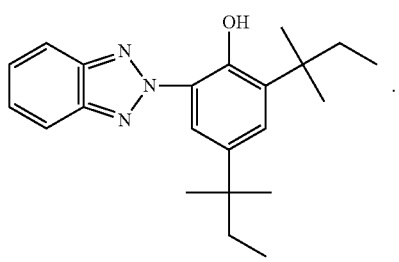

15. The heat-ray shielding film according to claim 12, wherein content of the ultraviolet absorbing agent in the heat-ray shielding film is greater than or equal to 0.02% by mass and less than or equal to 5.0% by mass.

16. A heat-ray shielding laminated transparent substrate comprising:
a plurality of transparent substrates; and
a heat-ray shielding film including
composite tungsten oxide particles;
a dispersant;
a thermoplastic resin; and
a silane coupling agent that is a metal coupling agent,
wherein the composite tungsten oxide particles are represented by a general formula $M_xWO_y$, where M is one or more elements selected from Cs, Rb, K, Tl, In, Ba, Li, Ca, Sr, Fe, Sn, Al, Cu, and Na, $0.1 \leq x \leq 0.5$, and $2.2 \leq y \leq 3.0$, and
wherein the heat-ray shielding film is disposed between the plurality of transparent substrates.

17. The heat-ray shielding laminated transparent substrate according to claim 16, wherein at least one of the plurality of transparent substrates is a glass substrate.

18. The heat-ray shielding laminated transparent substrate according to claim 16, wherein at least one infrared reflecting film is further disposed between the plurality of transparent substrates.

19. The heat-ray shielding laminated transparent substrate according to claim 18, wherein, when the infrared reflecting film is laminated on a transparent glass substrate, a maximum value of reflectance with respect to light with a wavelength from 700 nm to 1200 nm is greater than or equal to 30% and less than or equal to 100%.

20. An automobile comprising:
a window material including a heat-ray shielding laminated transparent substrate including
a plurality of transparent substrates; and
a heat-ray shielding film including
composite tungsten oxide particles;
a dispersant;
a thermoplastic resin; and
a silane coupling agent that is a metal coupling agent,
wherein the composite tungsten oxide particles are represented by a general formula $M_xWO_y$, where M is one or more elements selected from Cs, Rb, K, Tl, In, Ba, Li, Ca, Sr, Fe, Sn, Al, Cu, and Na, $0.1 \leq x \leq 0.5$, and $2.2 \leq y \leq 3.0$, and
wherein the heat-ray shielding film is disposed between the plurality of transparent substrates.

21. A building comprising:
a window material including a heat-ray shielding laminated transparent substrate including
a plurality of transparent substrates; and
a heat-ray shielding film including
composite tungsten oxide particles;
a dispersant;
a thermoplastic resin; and
a silane coupling agent that is a metal coupling agent,
wherein the composite tungsten oxide particles are represented by a general formula $M_xWO_y$, where M is one or more elements selected from Cs, Rb, K, Tl, In, Ba, Li, Ca, Sr, Fe, Sn, Al, Cu, and Na, $0.1 \leq x \leq 0.5$, and $2.2 \leq y \leq 3.0$, and
wherein the heat-ray shielding film is disposed between the plurality of transparent substrates.

* * * * *